United States Patent
Katsuragi et al.

(10) Patent No.: US 7,966,471 B2
(45) Date of Patent: Jun. 21, 2011

(54) STORAGE CONTROLLER AND METHOD FOR CONTROL OF A DATA STORAGE DEVICE

(75) Inventors: Eiju Katsuragi, Odawara (JP); Mikio Fukuoka, Odawara (JP)

(73) Assignee: Hitachi, Ltd., Tokyo (KP)

( * ) Notice: Subject to any disclaimer, the term of this patent is extended or adjusted under 35 U.S.C. 154(b) by 679 days.

(21) Appl. No.: 12/068,515

(22) Filed: Feb. 7, 2008

(65) Prior Publication Data

US 2009/0138672 A1    May 28, 2009

(30) Foreign Application Priority Data

Nov. 22, 2007 (JP) ................................. 2007-303672

(51) Int. Cl.
    *G06F 12/06*      (2006.01)
(52) U.S. Cl. ...... 711/171; 711/111; 711/4; 711/E12.084
(58) Field of Classification Search .................. None
See application file for complete search history.

(56) References Cited

U.S. PATENT DOCUMENTS

| 5,706,298 A | 1/1998 | Sandorfi |
| 5,819,054 A | 10/1998 | Ninomiya et al. |
| 6,191,712 B1 * | 2/2001 | Still ............................... 341/95 |
| 2003/0161239 A1 * | 8/2003 | Yamawaki ................. 369/59.25 |
| 2006/0161756 A1 | 7/2006 | Yagisawa et al. |

FOREIGN PATENT DOCUMENTS

| JP | 2000-347815 | 6/1999 |
| JP | 2006-195851 | 1/2005 |

* cited by examiner

*Primary Examiner* — Reginald G Bragdon
*Assistant Examiner* — Eric Loonan
(74) *Attorney, Agent, or Firm* — Volpe and Koenig, P.C.

(57) ABSTRACT

A storage controller of the present invention can input and output data even when the track size, which is the host management unit, is not consistent with the block size of the storage device. A boundary correction unit adds gap data corresponding to a gap size to data in a buffer memory so that the boundary of the track and boundary of the block inside the storage device match. A guarantee code is added to each logical block received from the host, and these guarantee code-appended blocks are stored in a cache memory. By providing a gap in the storage device every 116 extended logical blocks, the start position of the lead block of a track matches up with the start position of the logical blocks of the storage device.

8 Claims, 26 Drawing Sheets

| DEVICE ID-VDEV CORRESPONDENCE MANAGEMENT TABLE ||
| C21 | C22 |
| DEVICE ID | VDEV # |
| 001 | 001 |
| 002 | 001 |
| 003 | 002 |
| ... | ... |

T30

| VDEV MANAGEMENT TABLE ||||||
| C31 | C32 | C33 | C34 | C35 | C36 |
| VDEV # | SLOT SIZE | RAID LEVEL | NO. OF DATA DRIVES | NO. OF SLOTS IN PARITY CYCLE | DISK TYPE |
| 001 | 512 | 1 | 1 | 8 | FC |
| 002 | 116 | 5 | 3 | 24 | SATA |
| 003 | 96 | 6 | 6 | 48 | SAS |
| ... | ... | ... | ... | ... | ... |

FIG. 13
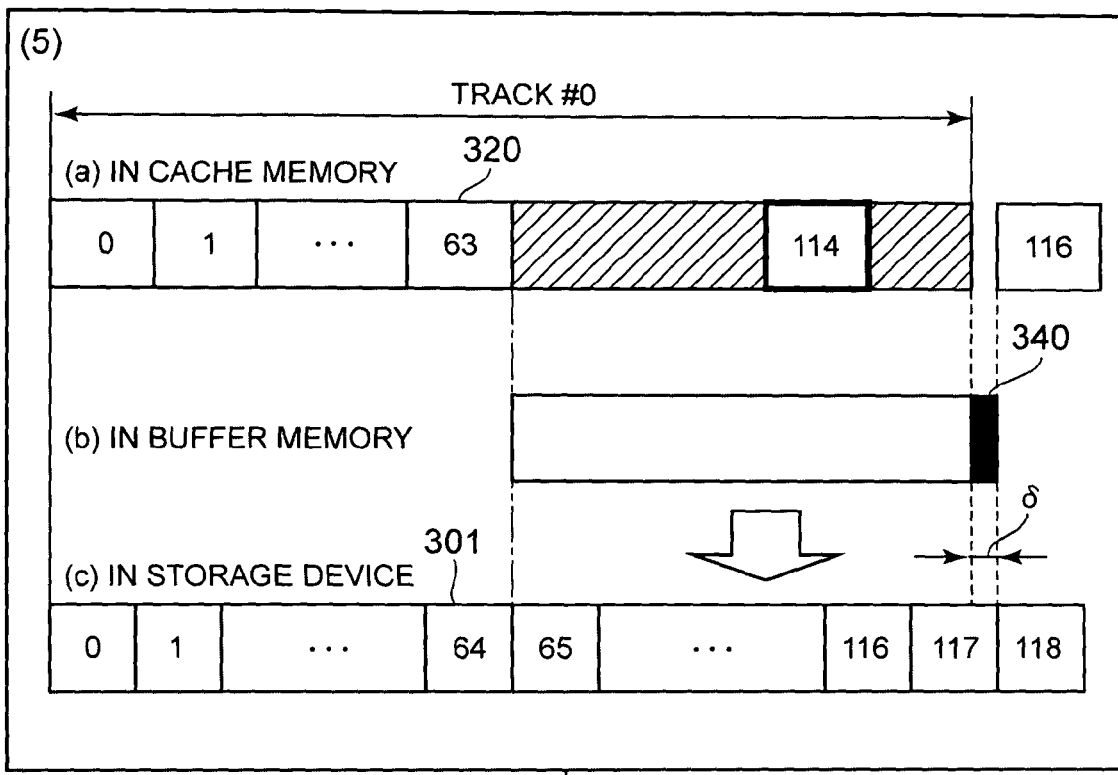
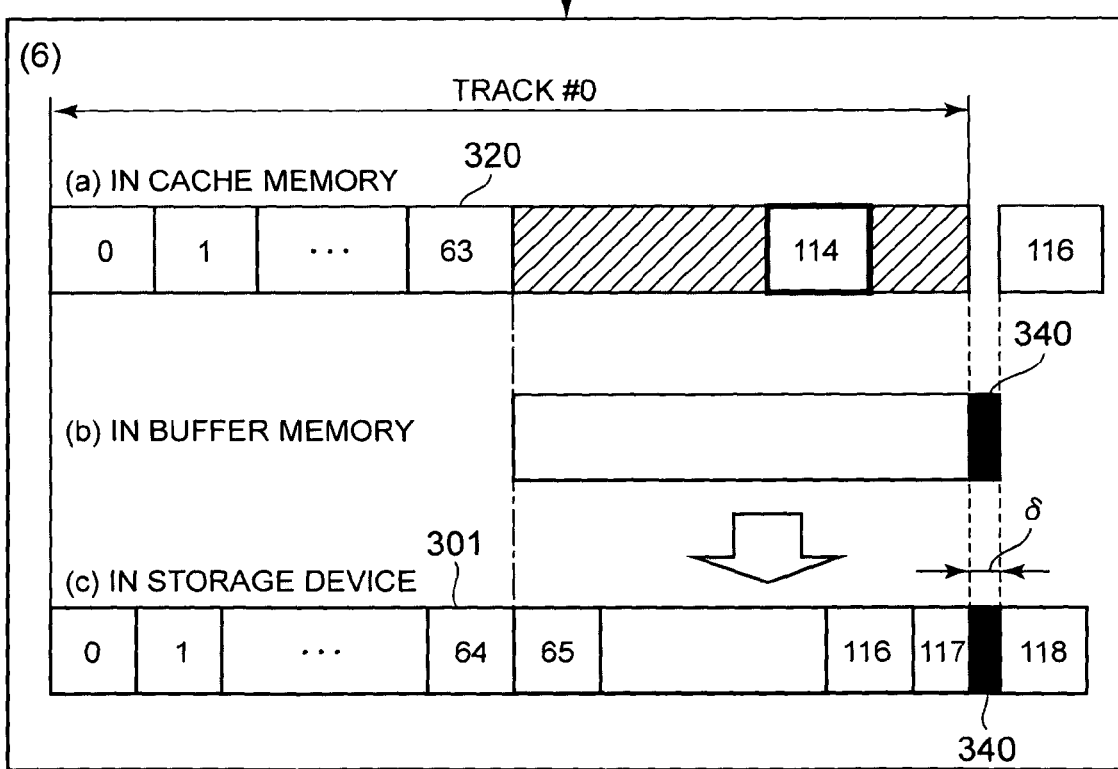

FIG. 20
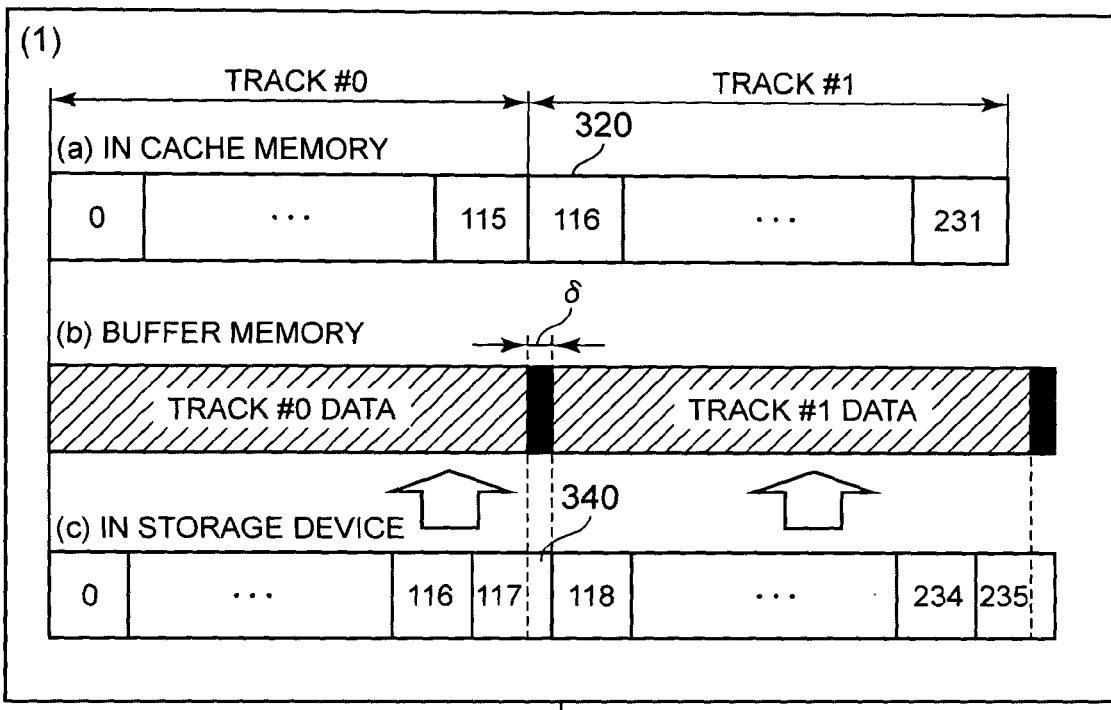
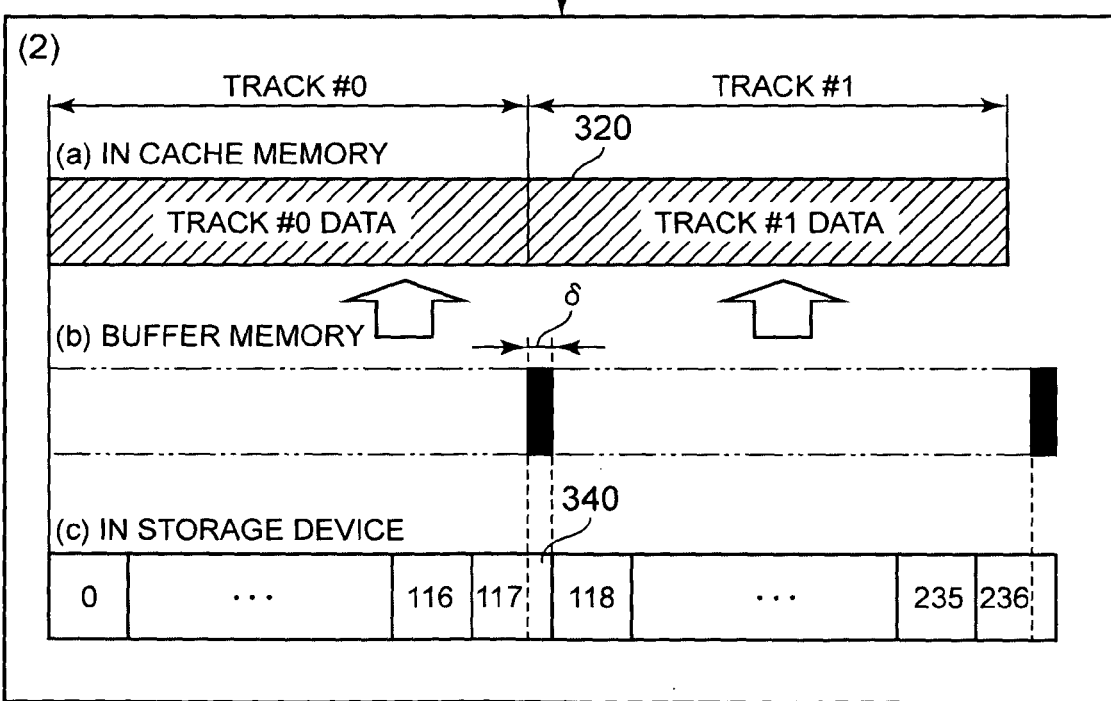

STORAGE CONTROLLER AND METHOD FOR CONTROL OF A DATA STORAGE DEVICE

CROSS-REFERENCE TO RELATED APPLICATIONS

This application relates to and claims priority from Japanese Patent Application number 2007-303672, filed on Nov. 22, 2007, the entire disclosure of which is incorporated herein by reference.

BACKGROUND OF THE INVENTION

1. Field of the Invention

The present invention relates to a storage controller and a storage controller control method.

2. Description of the Related Art

A storage controller, for example, is connected to a mainframe or other such host computer (hereinafter, "host"). The storage controller provides the host with a storage area based on RAID (Redundant Array of Inexpensive Disks).

In the storage controller, for example, redundancy can also be added to the data as with the well-known RAID 1 through RAID 6. The storage controller prepares for a failure in a disk drive by adding parity to the data, and writing a copy of the data to a different disk drive.

Furthermore, storage controllers that use guarantee codes are also known (Japanese Patent Laid-open No. 2000-347815, U.S. Pat. No. 5,819,054, and U.S. Pat. No. 5,706,298). In one prior art, a logical address (hereinafter, "LA (Logical Address)") of a logical block specified as the access destination by the host computer, and an LRC (Longitudinal Redundancy Check), which is determined by implementing an Exclusive OR operation on the data in the logical block, are respectively added to the logical block as a guarantee code, and this guarantee code and logical block are saved to a disk drive.

The LA is utilized for detecting an address error in a storage area into which the logical block data has been written. The LRC is utilized as an error detection symbol for detecting a data error in the logical block.

When the above-mentioned guarantee code is added to a logical block, there is a likelihood that the data management unit, which is handled inside the storage controller, will differ from the data management unit inside the disk drive. For example, in a disk drive in which the block length (sector length) is fixed at the size of the logical block, data is stored in logical block units. Therefore, when the block size is increased by adding a guarantee code to the logical block, the disk drive format may make it impossible to store the guarantee code-appended logical block as-is.

Accordingly, to solve for this problem, a fourth Patent Document (Japanese Patent Laid-open No. 2006-195851) proposes a technique for affixing the lowest common multiple of the logical block size and the guarantee code-appended logical block size as a value when inputting/outputting data to/from the disk drive.

As disclosed in the above-mentioned fourth Patent Document (Japanese Patent Laid-open No. 2006-195851), configuring the lowest common multiple for the logical block size and the guarantee code-appended logical block size as the basic unit when the storage controller is writing data to the disk drive makes it possible to write a logical block, to which a guarantee code has been added, to a disk drive having a fixed sector length. Hereinafter, a logical block whose size has been increased by the addition of a guarantee code will be called an extended logical block.

For example, if it is supposed that the size of the logical block is 512 bytes and the size of the guarantee code is eight bytes, the size of the extended logical block becomes 520 bytes. The lowest common multiple of 512 bytes and 520 bytes is 33280 bytes. Respectively appending 8-byte guarantee codes to each of 64 logical blocks received from the host computer makes the overall data size 33280 bytes. This value corresponds to the size of 65 logical blocks (33280=512×65).

In this case, the two ends of the data configured from 64 extended logical blocks matches up with the two ends of the 65 logical blocks. Therefore, the 64 extended logical blocks can be stored in the disk drive as 65 logical blocks. For convenience sake, in this specification, for example, the method for reading and writing data at the size of the lowest common multiple of the logical block size and the extended logical block size will be called lowest-common-multiple-unit data access.

A process, which reads out old data stored in a storage device, merges this old data with new data, and thereafter, rewrites the merged data back to the storage device, will be called a read-modify-write process.

Now then, when the host computer is a mainframe, the mainframe manages data in units called tracks. One track, for example, is constituted from either 96 or 116 logical blocks.

When a logical block targeted for updating exists in the anterior area of a track, from the lead block to the $64^{th}$ logical block of the track, a read-modify-write process can be carried out using lowest-common-multiple-unit data access. However, when the update-targeted logical block exists in the posterior area of the track beyond the $65^{th}$ logical block, using lowest-common-multiple-unit data access results in processing being carried out across two tracks. In this case, data corresponding to the logical blocks from the $65^{th}$ block to the $128^{th}$ block must be read out from the storage device. However, the $117^{th}$ through the $128^{th}$ logical blocks constitute a different track.

Accordingly, when the update-targeted block location exists in the track posterior area, it is necessary to carry out processing that spans a plurality of adjacent tracks. When a read process or a write process is carried out for the other track adjacent to the track comprising the update-targeted block, it is not immediately possible to read out the data required for updating, raising the likelihood of wait time occurring. The occurrence of wait time lowers the throughput of the storage controller.

Furthermore, since a cache area for receiving the data of the adjacent other track must be secured, twice as much cache memory is needed. This reduces the cache hit ratio, and lowers the storage controller throughput.

SUMMARY OF THE INVENTION

With the foregoing in view, an object of the present invention is to provide a storage controller and a storage controller control method capable of curbing performance degradation even when the size of a first block used in a host computer and storage device differs from the size of a second block used inside the storage controller. A further object of the present invention is to provide a storage controller and storage controller control information capable of making the boundary of a track configured from a plurality of extended logical blocks match up with the boundary of physical blocks inside a storage device. Yet further objects of the present invention should become clear from the descriptions of the embodiments, which will be explained hereinbelow.

A storage controller according to a first aspect of the present invention designed to solve for the above-mentioned problems is a storage controller for controlling data input/output between a host computer and a storage device storing the data, and comprises a first communication controller, which sends/receives data to/from the host computer, and which sends/receives this data to/from the host computer in first block units having a first size; a first data adder for creating a second block having a second size that is larger than the first size by respectively adding a prescribed first data to each of the first blocks of data received from the host computer; a second communication controller for sending/receiving data to/from the storage device, which stores the data in the first block units; a first memory, which is provided between the first communication controller and the second communication controller, and which manages data in the second block units; a second memory, which is provided between the first memory and the storage device; and a boundary correction unit, which matches the boundary of a track, which is a unit of data management used by the host computer, to the boundary of the first block inside the storage device, and which (1) matches the boundary of a track to the boundary of a first block inside the storage device by adding a prescribed-size second data to data to be transferred from the first memory to the second memory, and (2) matches the boundary of a track to the boundary of a second block inside the first memory by removing the second data from the data to be transferred from the second memory to the first memory.

In a second aspect according to the first aspect, the boundary correction unit matches the start position of the lead second block of the respective second blocks, which configure the data to be transferred from the first memory to the second memory, to the start position of the first block inside the storage device.

In a third aspect according to either the first aspect or the second aspect, the boundary correction unit, by adding the second data to the data to be transferred from the first memory to the second memory, makes this data into data that is an integral multiple of the first size.

In a fourth aspect according to any of the first through the third aspects, the second data is either padding data configured from a 0 bit, or indefinite data.

In a fifth aspect according to any of the first through the fourth aspects, the boundary correction unit decides the scope of the data to be read out to the second memory from the storage device in accordance with the location, on the track, of the second block to be updated by the host computer.

In a sixth aspect according to any of the first through the fourth aspects, the boundary correction unit determines whether the location, on the track, of the block to be updated by the host computer corresponds to any of (C1) a first case, in which the location on the track is only in the track posterior area, which is subsequent to the track anterior area from the beginning of the track up to a data size determined as the lowest common multiple of the first size and the second size; (C2) a second case, in which the location on the track is in both the track anterior area and the track posterior area; or (C3) a third case, in which the location on the track is only in the track anterior area, and decides the size of data transfer between the second memory and the storage device in accordance with the determined case.

In a seventh aspect according to any of the first through the sixth aspects, the boundary correction unit and the second memory are respectively disposed in the second communication controller.

In an eighth aspect according to any of the first through the sixth aspects, the boundary correction unit and the second memory are respectively disposed in the storage device.

A storage controller control method according to a ninth aspect is a method for controlling a storage controller, which controls data input/output between a host computer and a storage device, and respectively executes a step for receiving from the host computer update-targeted data in first block units having a first size; a step for respectively adding a prescribed first data to each of the first blocks of update-targeted data, and for creating a second block having a second size that is larger than the first size; a step for storing, in a first memory, update-targeted data, which has been converted to data in the second block units; a step for reading out from the storage device prescribed data of a prescribed scope comprising the update-targeted data, and storing this data in a second memory; a step for removing a second data from the prescribed data stored in the second memory, converting the prescribed data to data of an integral multiple of the second size, and transferring this converted data to the first memory; a step for merging in the first memory the prescribed data transferred to the first memory with the update-targeted data stored in the first memory to create merged data; a step for transferring the merged data to the second memory; a step for converting in the second memory the merged data to data of the integral multiple of the first size by adding a prescribed size second data at the end of the merged data; and a step for writing the converted merged data to the storage device.

In a tenth aspect according to the ninth aspect, (C1) in the first case where the location, on the track, of the update-targeted data is only in the track posterior area, which is subsequent to the track anterior area from the beginning of the track up to a data size determined as the lowest common multiple of the first size and the second size, the data of the track posterior area is read out from the storage device as the data of the prescribed scope; (C2) in the second case where the location, on the track, of the update-targeted data is in both the track anterior area and the track posterior area, the entire track is read out from the storage device as the data of the prescribed scope; and (C3) in the third case where the location, on the track, of the update-targeted data is only in the track anterior area, and the data of the track anterior area is read out from the storage device as the data of the prescribed scope.

At least one part of either the respective units or the respective steps of the present invention may be configured as a computer program. This computer program can be affixed to and distributed via a recording medium, and can also be delivered via a network.

BRIEF DESCRIPTION OF THE DRAWINGS

FIG. 5 is a schematic diagram showing both a table for managing the corresponding relationship between a device ID and a VDEV, and a table for managing the configuration of the VDEV;

FIG. 13 is a schematic diagram showing how data is transferred from the buffer memory to the storage device;

FIG. 20 is a schematic diagram showing how data on contiguous tracks is transferred from the storage device to the cache memory by way of the buffer memory;

DETAILED DESCRIPTION OF THE PREFERRED EMBODIMENTS

Figure 1:
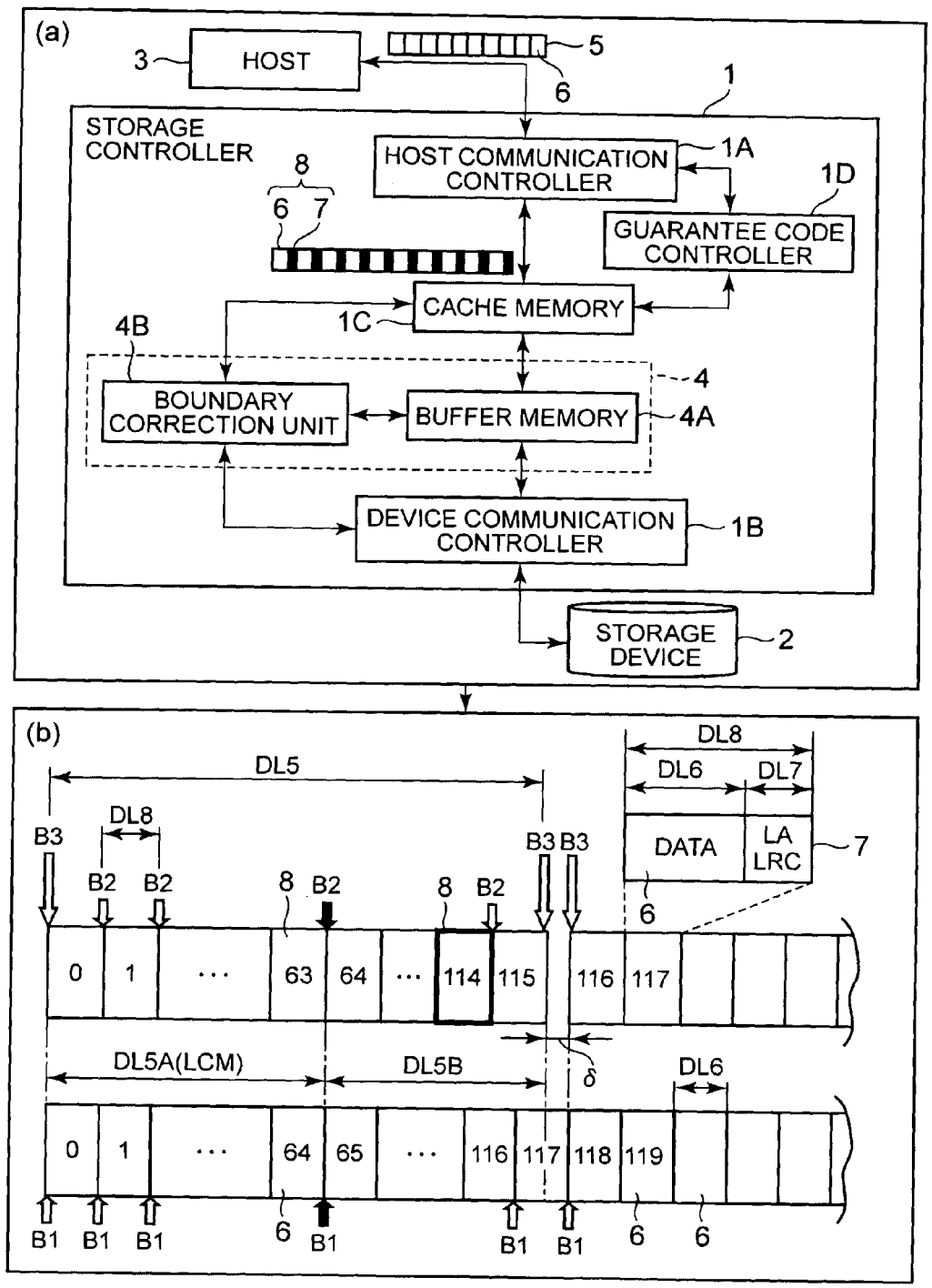
FIG. 1 is a schematic diagram showing the overall concept of the embodiment of the present invention.

The embodiments of the present invention will be explained below based on the figures. First, the concept of the present invention will be explained initially, after which the specific embodiments will be explained. FIG. 1 is a diagram schematically showing the concept of the present invention. FIG. 1 and the following disclosures related to FIG. 1 present an overview of the present invention to the extent necessary to understand and implement the present invention, and do not purport to limit the scope of the present invention to the scope disclosed in FIG. 1.

FIG. 1(a) shows the overall configuration of a storage system comprising a storage controller according to the present invention. This storage system, for example, comprises a storage controller 1, a storage device 2, and a host 3.

The storage device 2, for example, is configured as a hard disk device in which the sector length is fixed at the size of a logical block, like a SATA (Serial AT Attachment) disk or SAS (Serial Attached SCSI) disk. Furthermore, for convenience sake, in the following explanation, a physical block inside the storage device will be called a logical block.

However, the present invention is not limited to a SATA disk or SAS disk, and as long as the sector length of a storage device is fixed at the logical block size, other types of storage devices, such as a flash memory device, can also be used. Furthermore, as will become clear from the embodiments explained hereinbelow, it is also possible to utilize an FC disk, which can match the sector length to the size of an extended logical block.

The host 3 is configured as a mainframe computer. The host 3 and the storage controller 1, for example, carry out data communications in accordance with a communication protocol, such as FICON (Fibre Connection: a registered trademark), ESCON (Enterprise System Connection: a registered trademark), ACONARC (Advanced Connection Architecture: a registered trademark), FIBARC (Fibre Connection Architecture: a registered trademark) and so forth. The host 3, for example, can manage data in track 5 units, which are configured from either 96 or 116 logical blocks 6.

The storage controller 1 is disposed between the host 3 and the storage device 2, and controls the transfer of data between the host 3 and the storage device 2. The storage controller 1, for example, comprises a host communication controller 1A; a device communication controller 1B; a cache memory 1C; a guarantee code controller 1D; and a boundary controller 4.

This host communication controller 1A corresponds to the "first communication controller". The host communication controller 1A receives a command and data from the host 3, and sends the result of command processing to the host 3.

The device communication controller 1B corresponds to the "second communication controller". The device communication controller 1B writes data to the storage device 2, and reads data from the storage device 2.

The cache memory 1C corresponds to the "first memory", and stores data received from the host 3, and data read out from the storage device 2.

The boundary controller 4 is disposed between the cache memory 1C and the device communication controller 1B. The boundary controller 4, for example, comprises a buffer memory 4A; and a boundary correction unit 4B.

The guarantee code controller 1D corresponds to the "first data adder". The guarantee code controller 1D respectively adds a guarantee code 7 to each logical block 6. The guarantee code 7 corresponds to the "first data". The guarantee code 7, for example, can be configured from a logical address (LA) and a LRC.

The buffer memory 4A corresponds to the "second memory". The buffer memory 4A is disposed between the cache memory 1C and the device communication controller 1B. The cache memory 1C and storage device 2 send and receive data via the buffer memory 4A.

The boundary correction unit 4B corresponds to the "boundary correction unit". The boundary correction unit 4B, as will be explained below using FIG. 1(b), adds gap data corresponding to a gap size δ so that the track 5 boundary matches up with the boundary of a block 6 inside the storage device 2. The gap data corresponds to the "second data".

FIG. 1(b) shows a processing method for making the track 5 boundary match the boundary of a block 6 inside the storage device 2. The host 3 manages data in track units, and the respective tracks 5, for example, are configured from either 96 or 116 logical blocks 6. Hereinafter, a situation in which a single track 5 is configured from 116 logical blocks 6 will be given as an example and explained.

The size DL6 of a logical block 6, for example, is 512 bytes. This logical block 6 corresponds to the "first block". The guarantee code controller 1D adds a guarantee code 7 to the logical block 6. The size DL7 of the guarantee code 7, for example, is eight bytes.

Adding an 8-byte guarantee code 7 to a 512-byte logical block 6 creates an extended logical block 8. The extended logical block 8 corresponds to the "second block". The size DL8 of the extended logical block 8 is 520 bytes (DL8=DL6+DL7=512+8).

A guarantee code 7 is added to each logical block 6 received from the host 3, and these extended logical blocks 8 are stored in the cache memory 1C. The top portion of FIG. 1(b) shows the state inside the cache memory 1C, and the bottom portion of FIG. 1(b) shows the state inside the storage device 2.

Since the size of an extended logical block 8 stored in the cache memory 1C differs from the size of a logical block 6 stored in the storage device 2, the boundary B2 of an extended logical block 8 does not match up with the boundary B1 of a logical block 6.

However, when the size of the data stored in the cache memory 1C and the size of the data stored in the storage device 2 constitute the value DL5A (LCM) of the lowest common multiple of the size DL6 of the logical block 6 and the size DL8 of the extended logical block 8, the two boundaries B3 and B2 match. More specifically, the one data size, which comprises 64 extended logical blocks 8, matches the other data size, which comprises 65 logical blocks 6. Therefore, the boundaries at the two ends of the one data size match up with the boundaries at the two ends of the other data size.

As shown in the upper left portion of FIG. 1(b), a certain track 5 is configured from a total of 116 extended logical blocks 8 from the $0^{th}$ to the $115^{th}$ block. As shown by the dark box, a situation in which the host 3 has issued an update request for the $114^{th}$ block 8 will be considered.

In order to process the update request, the storage controller 1 must read the old data out from the storage device 2, and merge new data with the old data. For this reason, if the $64^{th}$ extended logical block 8 is the lead block, and data corresponding to $64^{th}$ extended logical blocks 8 is read out from the storage device 2, data up to the block 6 corresponding to the adjacent track (the track configured from the $116^{th}$ and subsequent extended logical blocks 8) will be read out.

That is, a total of 65 logical blocks 6, from the $65^{th}$ logical block 6 to the $129^{th}$ logical block 6, are read out from the storage device 2. However, logical blocks, which store only data related to the adjacent track 5, are included among these 65 logical blocks 6. Therefore, if the host 3 is accessing the adjacent track 5, the update request related to the $114^{th}$ extended logical block 8 cannot be processed until this access ends.

Accordingly, in this embodiment, providing a gap δ in the storage device 2 every 116 extended logical blocks causes the start location of the lead block of a track 5 to match up with the start location of the logical blocks 6 of the storage device 2. That is, in this embodiment, adding size δ worth of gap data at the end of each track causes the lead locations of the respective tracks to match up with the boundaries B1 of the logical blocks 6.

As described hereinabove, in this embodiment, a gap δ of a prescribed size (in this case, 96 bytes) is created in the storage device 2 between the end B3 of the previous track 5 and the start B3 of the adjacent track 5.

The storage controller 1 reads out from the storage device 2 a total of 53 logical blocks 6 of data, from the $65^{th}$ logical block 6 to the $117^{th}$ logical block 6, and stores these blocks 6 in the buffer memory 4A. The data transferred from the storage device 2 to the buffer memory 4A comprises the above-mentioned gap data.

The boundary correction unit 4B transfers to the cache memory 1C only the part of the data stored in the buffer memory 4A from which the gap data has been removed. Removing the gap data makes this data the size of the integral multiple of the size DL8 of the extended logical block 8. That is, the data from the $64^{th}$ extended logical block 8 to the $115^{th}$ extended logical block 8 is stored in the cache memory 1C.

As described hereinabove, since the gap data is not transferred from the buffer memory 4A to the cache memory 1C, command processing is not impacted at all no matter what kind of data is stored in the gap δ in the storage device 2.

The storage controller 1 merges the old data related to the $64^{th}$ through the $115^{th}$ extended logical blocks 8 transferred from the buffer memory 4A to the cache memory 1C with the new data related to the $114^{th}$ extended logical block 8 received from the host 3 in the cache memory 1C.

The merged data is transferred from the cache memory 1C to the buffer memory 4A. The boundary correction unit 4B adds gap data at the end of the merged data in the buffer memory 4A. Consequently, the merged data becomes data having the size of the integral multiple of the logical block 6 size DL6. The gap data-appended merged data is stored in the $65^{th}$ through the $117^{th}$ logical blocks 6.

The above explanation explains a situation in which the location of the extended logical block 8 updated by the host 3 exists in the posterior area of the track 5. In this embodiment, the size of the data transferred between the buffer memory 4A and cache memory 1C is controlled by the location of the block to be updated.

A track 5 can be broadly divided into an anterior area DL5A and a posterior area DL5B. The anterior area DL5A corresponds to the "track anterior area", and the posterior area DL5B corresponds to the "track posterior area".

For example, the anterior area DL5A can be defined as an area of a size that enables data access in a lowest common multiple unit from the beginning of the track 5. The posterior area DL5B can be defined as an area from the end of the anterior area DL5A to the end of the track 5.

When a block targeted for update by the host 3 is located in the anterior area DL5A, since data access can be carried out in a lowest common multiple (L.C.M.) unit, 65 logical blocks 6 can be read out from the storage device 2. Since both ends of the anterior area DL5A match the boundaries of the logical blocks 6 of the storage device 2, there is no need to add gap data.

By contrast, when the block targeted for update by the host 3 is located in the posterior area DL5B, data access cannot be carried out using a lowest common multiple unit. This is because the track size DL5 subsequent to adding a guarantee code 7 is not an integral multiple of the value of the lowest common multiple of the logical block 6 size and the extended logical block 8 size. Therefore, when updating a block located in the posterior area DL5B, as described hereinabove, gap data is appended at the end of the extended logical block 8 belonging to the posterior area DL5B, and this gap data-appended extended logical block 8 is written to the storage device 2.

When blocks targeted for updating by the host 3 are located in both the anterior area DL5A and posterior area DL5B, adding the gap data makes it possible to carry out a read-modify-write process in track units.

Configuring this embodiment like this enables a guarantee code 7-appended extended logical block 8 to be stored in a storage device 2 having a fixed block size of 512 bytes.

Furthermore, in this embodiment, since the lowest common multiple of the logical block 6 size and the extended logical block 8 size does not match the track size, which is the management unit of the host 3, a write process can be carried out using only the data corresponding to the track having the update-targeted block, and there is no need to carry out write processing across a plurality of adjacent tracks. Therefore, in this embodiment, it is not necessary to wait until command processing related to an adjacent track ends. Furthermore, in this embodiment, it is possible to prevent increased utilization of the cache memory 1C, and to curb a drop in the cache hit ratio. Eliminating wait time and preventing a drop in the cache hit ratio can prevent the degradation of storage controller 1 throughput. This embodiment will be explained in detail below.

Embodiment 1

Figure 2:
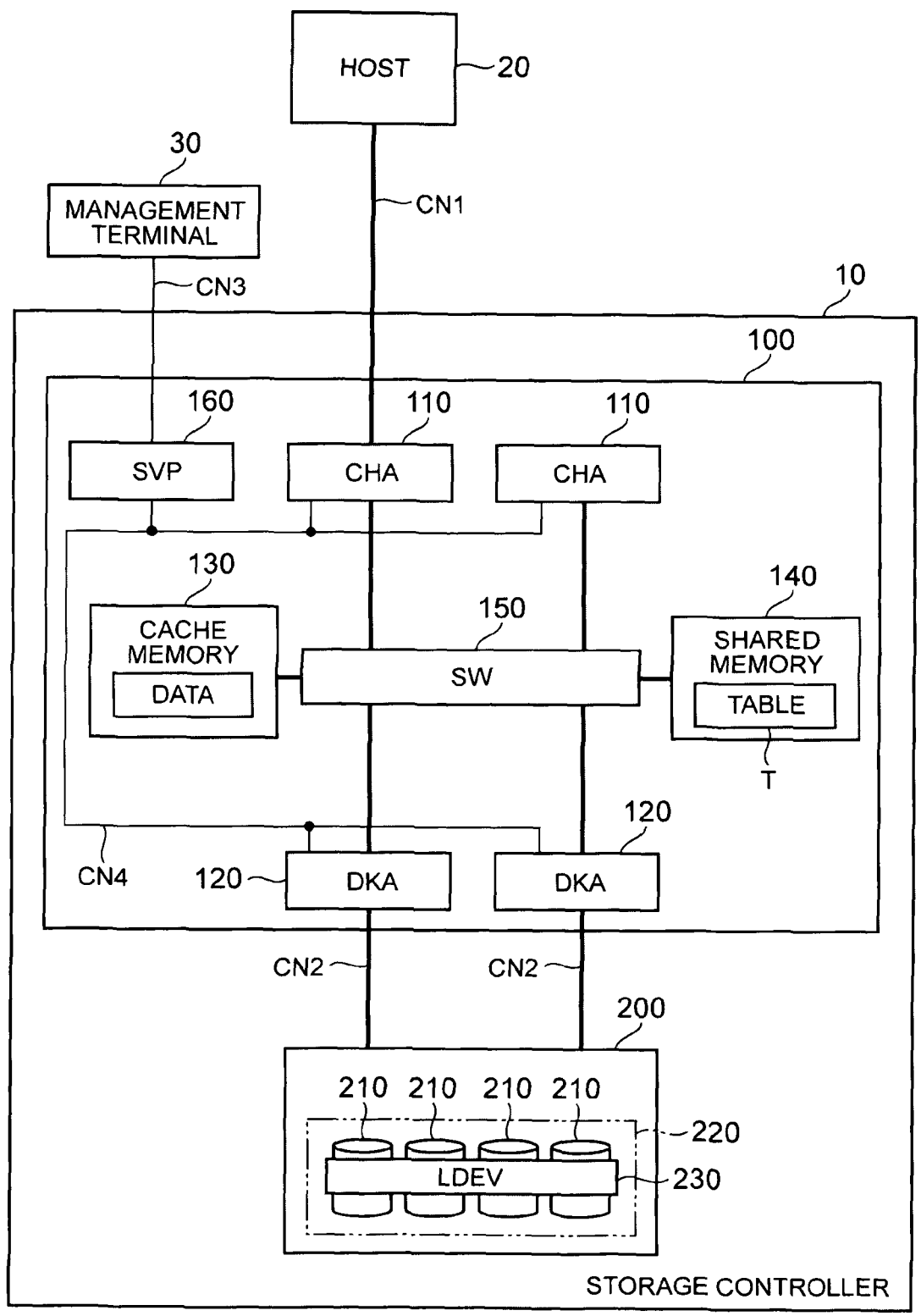
FIG. 2 is a block diagram showing the overall configuration of a storage system.

FIG. 2 is a schematic diagram showing the overall configuration of a storage system comprising a storage controller 10 related to this embodiment. This storage system, for example, can comprise at least one storage controller 10; either one or a plurality of hosts 20; and at least one management terminal 30.

The corresponding relationship to this embodiment described hereinabove using FIG. 1 will be explained. The storage controller 10 corresponds to the storage controller 1 of FIG. 1; storage device 210 correspond to the storage device 2 of FIG. 1; host 20 corresponds to the host 3 of FIG. 1; channel adapter 110 corresponds to the host communication controller 1A of FIG. 1; disk adapter 120 corresponds to device communication controller 1B of FIG. 1; and cache memory 130 corresponds to the cache memory 1C of FIG. 1.

Figure 3:
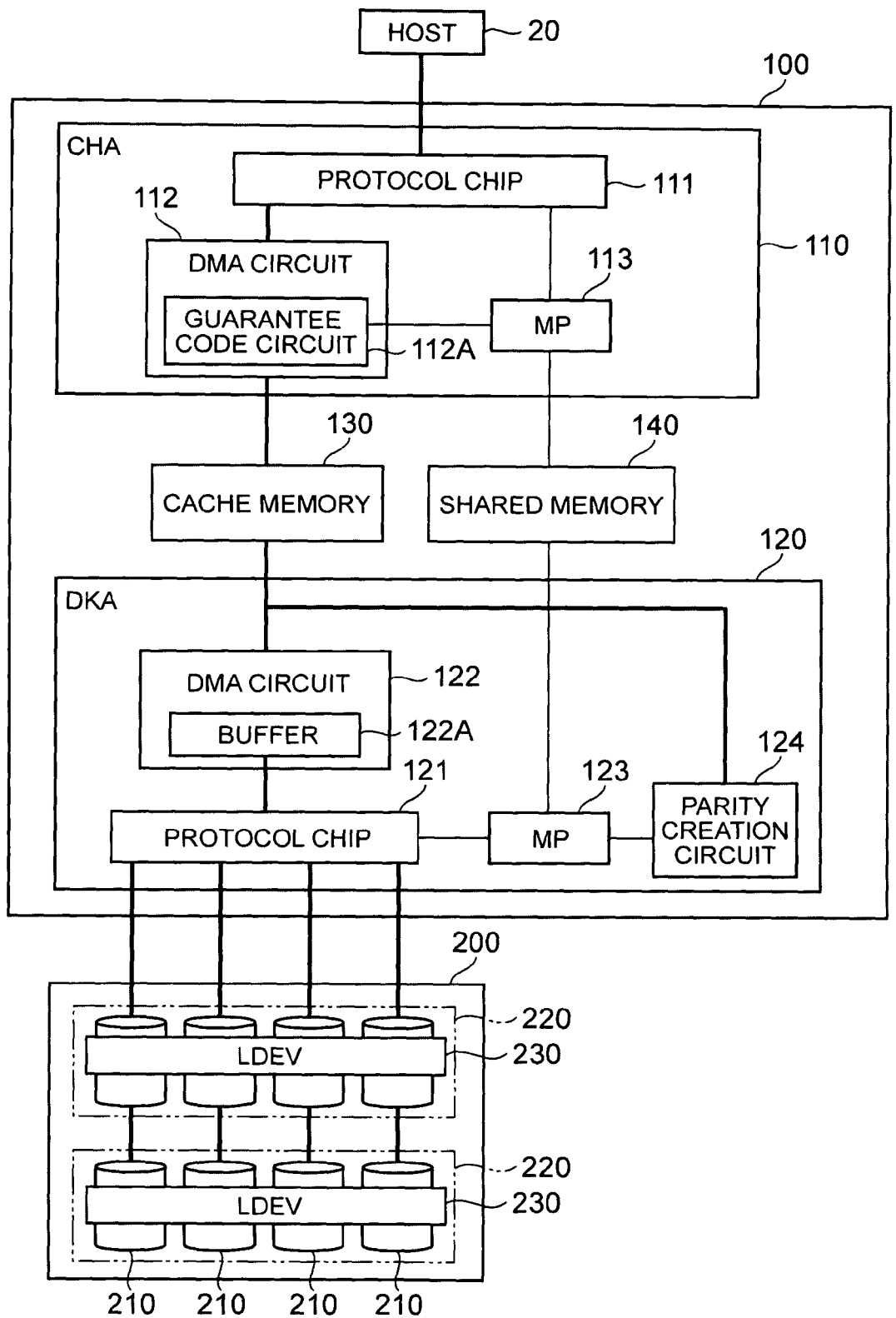
FIG. 3 is a block diagram showing the configuration of a controller.

Guarantee code circuit 112A shown in FIG. 3 corresponds to the guarantee code controller 1D of FIG. 1; DMA circuit 122 shown in FIG. 3 corresponds to the boundary controller 4 of FIG. 1; and buffer memory 122A shown in FIG. 3 corresponds to the buffer memory 4A of FIG. 1. The boundary correction unit 4B of FIG. 1 is realized by a processor inside the DMA circuit 122 executing a microprogram stored in the memory inside the DMA circuit 122. The boundary correction method will be explained hereinbelow using another figure.

The host 20 and management terminal 30 will be explained first, and the storage controller 10 will be explained next. The host 20, for example, is configured as a mainframe computer, and is connected to the storage controller 10 via a communications network CN1. The communication network CN1, for example, can be configured as an FC-SAN (Fibre Channel-Storage Area Network) or other such communication network.

The host 20, for example, uses a track configured from either 96 or 116 logical blocks as a unit for managing data. Furthermore, the present invention is applicable if the computer manages data in a size that is not the integral multiple of the lowest common multiple of the logical block size and extended logical block size. The host 20 issues a read command or a write command to the storage controller 10, and receives the result of this processing from the storage controller 10.

The management terminal 30 is connected to a service processor 160 inside the storage controller 10 via a communication network CN3. The communication network CN3, for example, is configured as a communication network such as a LAN (Local Area Network). The management terminal 30 collects various types of information inside the storage controller 10 via the service processor (hereinafter, SVP) 160. The management terminal 30 can specify various configurations inside the storage controller 10 via the SVP 160.

The configuration of the storage controller 10 will be explained. The storage controller 10 can be broadly divided into a controller 100; and a storage device installation unit 200. The controller 100, for example, comprises at least one or more channel adapters (hereinafter, CHA) 110; at least one or more disk adapters (hereinafter, DKA) 120; at least one or more cache memories 130; at least one or more shared memories 140; a connector ("SW" in the figure) 150; and an SVP 160. Furthermore, the configuration can be such that a plurality of controllers 100 is linked together via a switch. For example, a plurality of controllers 100 can also be configured into a cluster.

The CHA 110 is for controlling data communications with the host 20, and, for example, is configured as a computer device comprising a microprocessor and a local memory. Each CHA 110 comprises at least one or more communication ports.

The DKA 120 is for controlling data communications with the respective storage devices 210, and like the CHA 110, is configured as a computer device comprising a microprocessor and local memory.

The respective DKA 120 and the respective storage devices 210, for example, are connected by way of a communication network CN2, which conforms to a fibre channel protocol. The respective DKA 120 and the respective storage devices 210 transfer data in block units.

The path, by which the controller 100 accesses the respective storage devices 210, is made redundant. If a failure occurs in any one of the DKA 120 or communication networks CN2, the controller 100 can access a storage device 210 using the other DKA 120 and communication network CN2. Similarly, the path between the host 20 and the controller 100 can also be made redundant. The configurations of the CHA 110 and DKA 120 will be explained hereinbelow using FIG. 3.

The operations of the CHA 110 and DKA 120 will be briefly explained. The CHA 110, upon receiving a read command issued from the host 20, stores this read command in the shared memory 140. The DKA 120 constantly references the shared memory 140, and upon detecting an unprocessed read command, reads out the data from the storage device 210, and stores this data in the cache memory 130. The CHA 110 reads out the data transferred to the cache memory 130, and sends this data to the host 20.

Conversely, when the CHA 110 receives a write command issued from the host 20, the CHA 110 stores this write command in the shared memory 140. The CHA 110 stores the received write-data in the cache memory 130. Subsequent to storing the write-data in the cache memory 130, the CHA 110 notifies the host 20 that the write has ended. The DKA 120 reads out the data stored in the cache memory 130 in accordance with the write command stored in the shared memory 140, and stores this data in the prescribed storage device 210.

The cache memory 130, for example, is for storing user data and the like received from the host 20. The cache memory 130, for example, is configured from either a volatile memory or a nonvolatile memory. The shared memory 140, for example, is configured from a nonvolatile memory. The shared memory 140 stores a variety of tables T and management information, which will be explained hereinbelow.

The cache memory 130 and the shared memory 140 can be coexistently provided on the same memory board. Or, one part of the memory can be used as the cache area, and the other part can be used as the control area.

The connector 150 respectively connects the respective CHA 110, respective DKA 120, cache memory 130, and shared memory 140. Consequently, the CHA 110, DKA 120, cache memory 130, and shared memory 140 are all accessible to one another. The connector 150, for example, can be configured as a crossbar switch or the like.

The SVP 160 is respectively connected to the respective CHA 110 and respective DKA 120 via a LAN or other such internal network CN4. Further, the SVP 160 is connected to the management terminal 30 via the communication network CN3. The SVP 160 collects various statuses inside the storage controller 10, and provides these statuses to the management terminal 30. Furthermore, the SVP 160 can also be connected to only one of either the CHA 110 or DKA 120. This is because the SVP 160 is able to collect the various status information via the shared memory 140.

The controller 100 configuration is not limited to the above-described configuration. For example, the configuration can be such that the function for carrying out data communications with the host 20, the function for carrying out data communications with the storage devices 210, the function for temporarily storing data, and the function for rewritably storing various types of tables are respectively provided on one or a plurality of control boards.

The configuration of the storage device installation unit 200 will be explained. The storage device installation unit 200 comprises a plurality of storage devices 210. The respective storage devices 210, for example, are configured as hard disk devices. Flash memory devices, magneto-optical storage devices, and holographic memory devices can be utilized instead of hard disk devices.

Although the grouping will differ according to the RAID configuration, for example, a parity group 220 is configured in accordance with a prescribed number of storage devices 210, such as a two-device group or a four-device group. The parity group 220 is the virtualization of the physical storage areas possessed by the respective storage devices 210 inside the parity group 220.

Therefore, the parity group 220 is a virtualized physical storage device (VDEV). Either one or a plurality of logical devices (LDEV) 230 can be configured in the physical storage area of the parity group 220. A logical device 230 is mapped to a LUN (Logical Unit Number) and provided to the host 20.

In this embodiment, the storage device 210 will be explained using the example of a hard disk device. However, as mentioned above, the present invention is also capable of using storage devices other than hard disk devices. Further, for ease of understanding, a storage device will be expressed as a "disk" in the flowcharts.

FIG. 3 is a block diagram showing the configurations of the CHA 110 and DKA 120. The CHA 110, for example, comprises a protocol chip 111; a DMA circuit 112; and a microprocessor 113. The protocol chip 111 is a circuit for carrying out communications with the host 20. The microprocessor 113 controls the overall operation of the CHA 110.

The DMA circuit 112 is a circuit for transferring data between the protocol chip 111 and the cache memory 130 using the DMA (Direct Memory Access) mode. The DMA circuit 112 comprises a guarantee code circuit 112A. The guarantee code circuit 112A creates an extended logical block by configuring a guarantee code in a logical block received from the host 20. Furthermore, the guarantee code circuit 112A restores the logical block by removing the guarantee code from the extended logical block read into the cache memory 130.

The DKA 120, like the CHA 110, for example, comprises a protocol chip 121; a DMA circuit 122; and a microprocessor 123. Furthermore, the DKA 120 can also comprise a parity creation circuit 124.

The protocol chip 121 is a circuit for communicating with the respective storage devices 210. The microprocessor 123 controls the overall operation of the DKA 120. The parity creation circuit 124 is a circuit for creating parity data by carrying out a prescribed logical operation based on data stored in the cache memory 130.

The DMA circuit 122 is for carrying out the transfer of data between the storage device 210 and the cache memory 130 using the DMA mode. The DMA circuit 122 comprises a buffer memory (hereinafter, also called the buffer) 122A, and executes a DMA transfer via this buffer memory 122A. That is, data is sent and received between the cache memory 130 and the storage device 210 by way of the buffer memory 122A. As will be explained hereinbelow, the data boundary is adjusted in the buffer memory 122A.

Figure 4:
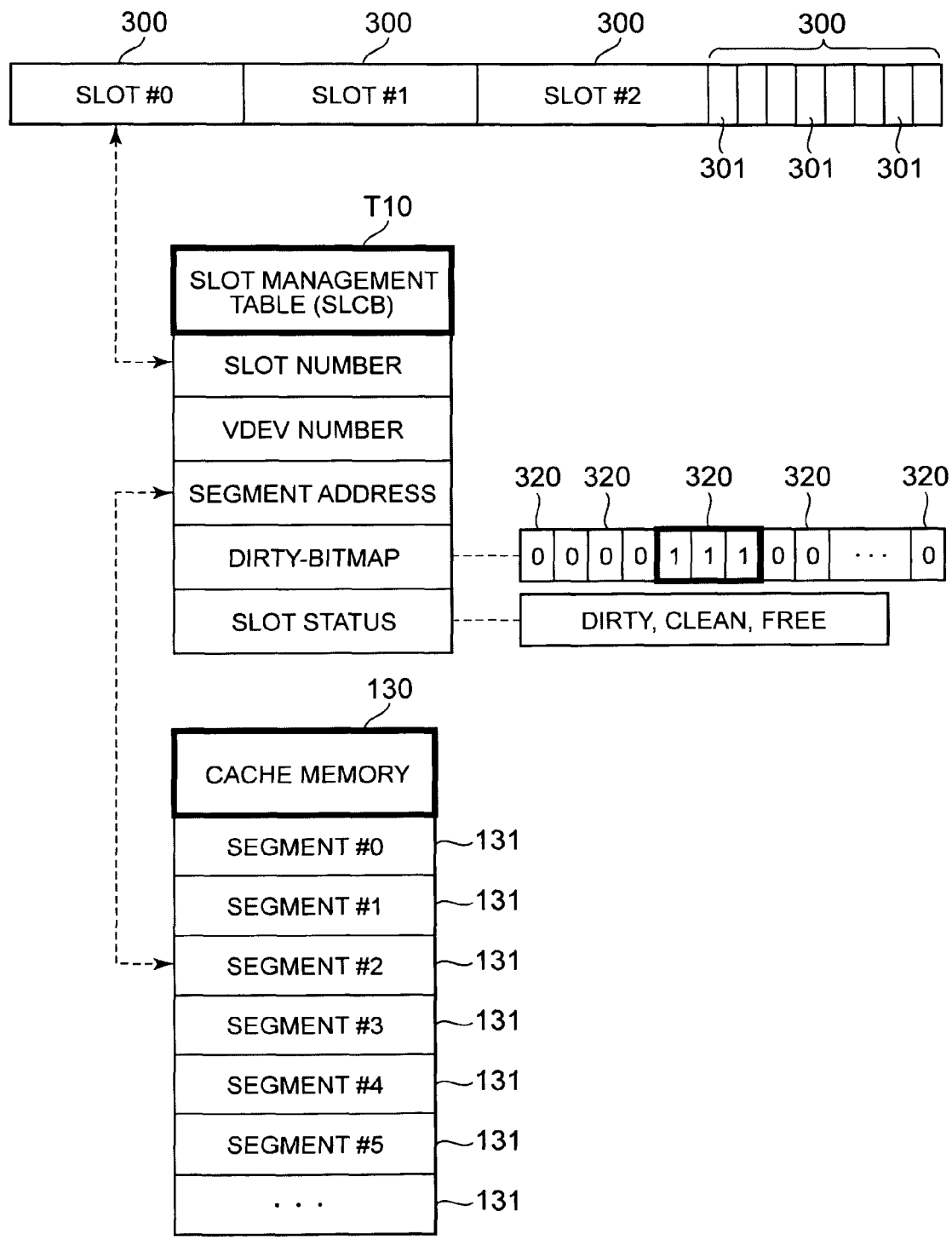
FIG. 4 is a schematic diagram showing the relationship between a slot and a cache.

FIG. 4 is a diagram schematically showing the management method of the cache memory 130. As shown in the top portion of FIG. 4, data sent from the host 20 to the storage controller 10 can be partitioned into either one or a plurality of slots.

Data, which is received from the host 20 and divided into a prescribed number of blocks, is called a slot 300. In the case of a mainframe, there is a track, which is a management unit peculiar to the mainframe, and the track is configured from either 96 or 116 logical blocks 301. The size of one logical block 301, for example, is 512 bytes.

In the case of a mainframe, the slot size matches the track size. This is because matching the slot size to the track size makes it easier for the mainframe to carry out processing for issuing a command by specifying a track number. Therefore, in this embodiment, the slot shown in FIG. 4 can be thought of as a track.

The cache memory 130 is configured from a plurality of segments 131. The size of one segment 131, for example, is 64 KB. Data from the host 20 is stored in a segment 131, which is allocated in slot units.

A slot management table T10 manages the corresponding relationship between a slot 300 and a segment 131 (hereinafter, the slot management table T10 will also be called the SLCB). The slot management table T10, for example, correspondently manages a slot number; VDEV number; segment address; dirty-bitmap; and slot status.

The slot number is identification information for specifying a slot 300 that is being targeted. The VDEV number is identification information for specifying the VDEV 220 mapped to the targeted slot 300. The segment address is information for identifying the segment to which this specified slot is to be allocated. That is, the segment address shows the storage-destination address of the data in this slot. When a segment is not allocated to a slot, "0" is configured as the value of the segment address.

The dirty-bitmap is update location management information for specifying an update location inside the relevant slot 300. One bit is respectively allocated to each logical block configuring a slot. A "1" is configured in an updated logical block, and a "0" is configured in a logical block that has not been updated. Therefore, referencing the dirty-bitmap makes it possible to learn which logical blocks in the slot are update-targeted logical blocks.

The slot status is information showing the status of the relevant slot. The status can be given as dirty, clean, or free. Dirty shows a state in which one or more "1" values are configured in the dirty-bitmap. That is, a dirty state shows a slot comprising an update-targeted logical block. Clean shows a state in which update-targeted data inside the slot has been written to the storage device 210, and the destage process has ended. Free shows a state in which the segment allocated to the relevant slot has been freed up and can be allocated to another slot.

Using the slot management table T10 can make it easy to manage the area of cache memory 130 in which data received from the host 20 is stored, the presence or absence of update data, and the location of update data.

FIG. 5 is a schematic diagram respectively showing a device ID-VDEV correspondence management table T20 and VDEV management table T30. These respective tables T20, T30 are stored in the shared memory 140. The CHA 110 and DKA 120 can copy at least a portion of the respective tables T20, T30 to the memories inside the CHA 110 and DKA 120, and can make use of this information.

The device ID-VDEV correspondence management table T20 is for managing the corresponding relationship between a logical device 230 and a virtual intermediate device VDEV 220. This table T20 correspondently manages a device ID_C21; and a VDEV number C22. The device ID_C21 is information for identifying a logical device 230. The VDEV number C22 is information for identifying a VDEV 220.

The VDEV management table T30 is for managing the configurations of the respective VDEV. The VDEV management table T30, for example, correspondently manages the VDEV number C31; slot size C32; RAID level C33; number of data drives C34; number of slots in the parity cycle C35; and disk type C36.

The VDEV number C31 is information for identifying the respective VDEV 220. The slot size C32 shows the number of logical blocks configuring the slot mapped to the relevant VDEV. The RAID level C33 shows the RAID type, such as RAID 1 through RAID 6. The number of data drives C34 shows the number of storage devices that store data.

The number of slots in the parity cycle C35 shows the number of slots included in one parity cycle. The disk type C36 shows the type of storage device 210 configuring the relevant VDEV 220.

Figure 6:
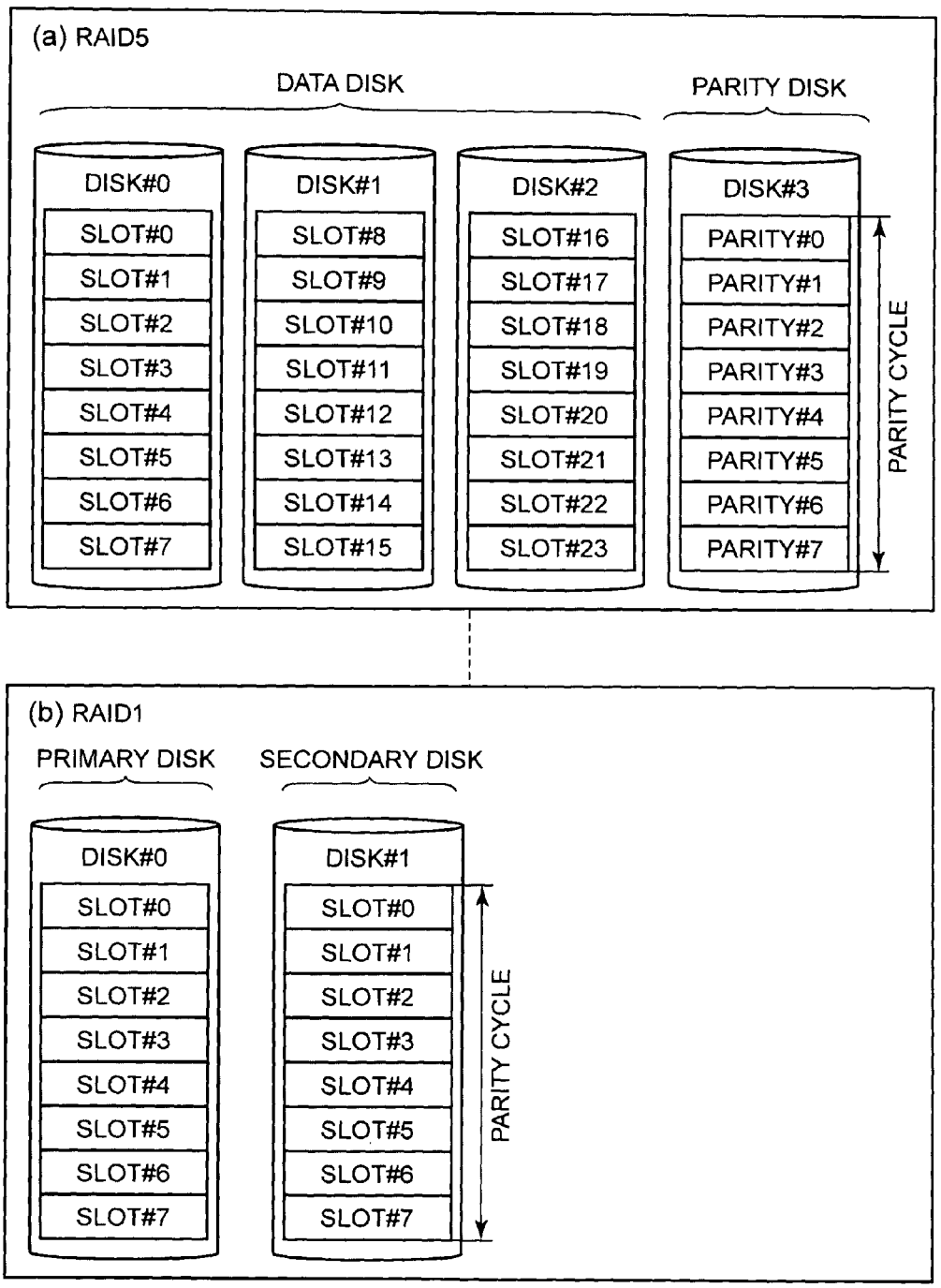
FIG. 6 is a schematic diagram showing how slots are arranged in storage devices.

FIG. 6 is a diagram schematically showing the mapping status between a slot 300 and a storage device 210. FIG. 6(a) shows the situation for RAID 5, and FIG. 6(b) shows the situation for RAID 1.

FIG. 6(a) shows a 3D+1P RAID 5 configured from three data disks (#0, #1, #2) and one parity disk (#3). Slot #0 through slot #7 are arranged in data disk (#0), slot #8 through slot #15 are arranged in data disk (#1), slot #16 through slot #23 are arranged in data disk (#2), and parity #0 through parity #7 are arranged in the parity disk (#3) on the right side. That is, eight contiguous slots are respectively arranged in each data disk.

An 8-slot parity (#0 through #7) size is called a parity cycle. In the parity cycle subsequent to the parity cycle shown in the figure, parity is stored in disk (#2), which is adjacent to disk (#3) on the left. Furthermore, in the subsequent parity cycle, parity is stored in disk (#1). Thus, the disk, in which parity data is stored, moves each parity cycle. As is clear from FIG. 6(a), the number of slots included in one parity cycle (C35 in table T30) is determined by multiplying the number of data disks by eight.

FIG. 6(b) shows a RAID 1 configuration. In RAID 1, the same data is respectively stored in both a primary disk and a secondary disk. The number of slots included in the parity cycle for RAID 1 is eight.

As described hereinabove, the mapping status of a slot and a storage device can be determined from the RAID level (C33) and the number of data drives (C34). Therefore, the storage destination for data received from the host 20 can be computed based on the above-mentioned mapping status.

Figure 7:
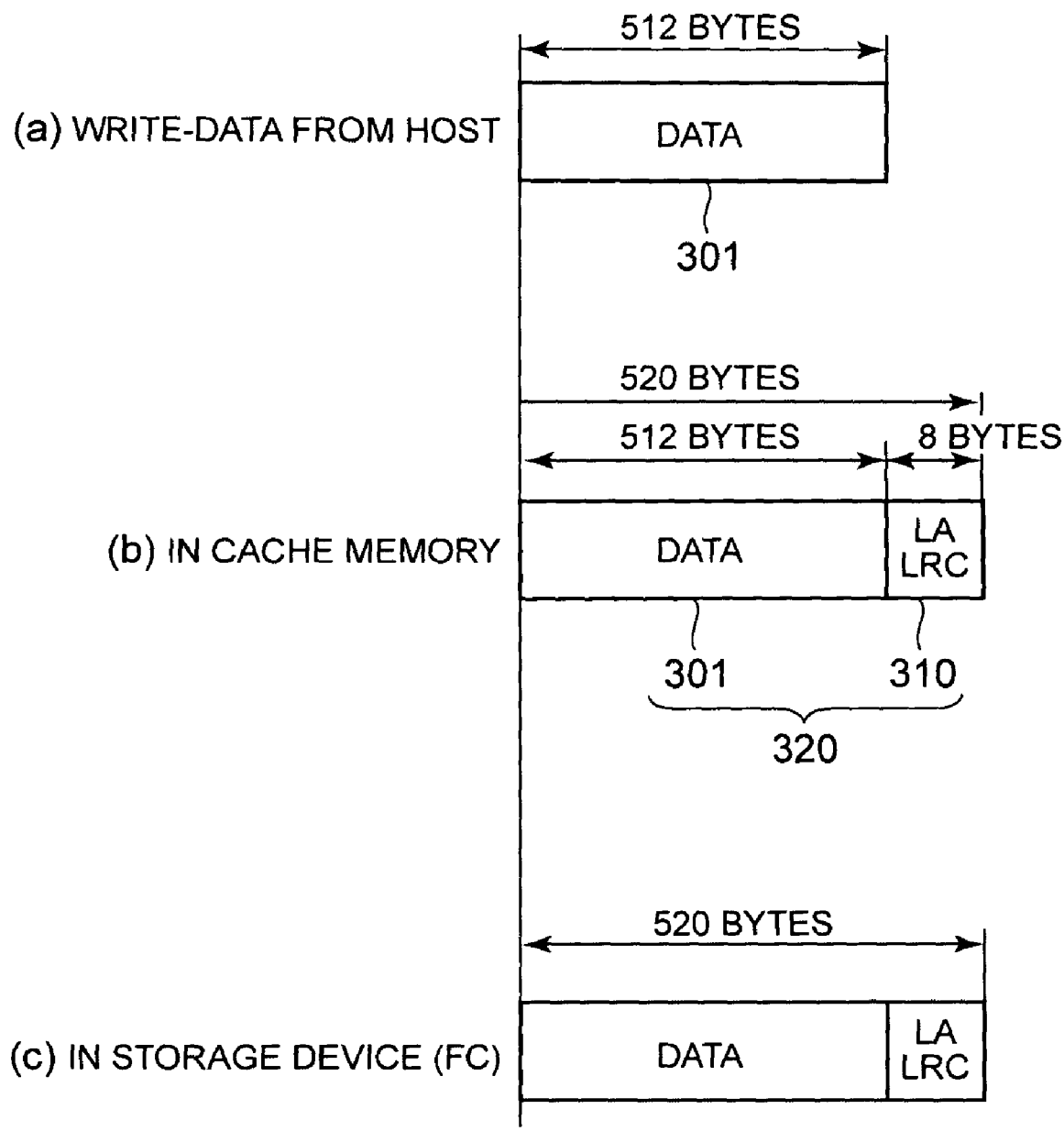
FIG. 7 is a schematic diagram showing how an extended logical block is created by adding a guarantee code to a logical block.

FIG. 7 is a schematic diagram showing the relationship between a logical block and an extended logical block. As shown in FIG. 7(a), a logical block 301 has a size of 512 bytes. The host 20 and storage device 210 use the logical block 301 as the minimal management unit.

As shown in FIG. 7(b), the CHA 110 respectively adds an 8-byte guarantee code 310 to each logical block 301 for data received from the host 20. The guarantee code 310, for example, comprises an LA and LRC. Adding an 8-byte guarantee code 310 to a 512-byte logical block 301 creates an extended logical block 320. The extended logical block 320 is stored in the cache memory 130. When data is sent to the host 20 from the CHA 110, the guarantee code 310 is removed from the extended logical block 320, and this data is sent to the host 20 as a logical block 301.

As shown in FIG. 7(c), for a storage device 210 configurable in a format of 520-byte units, like an FC disk, the extended logical block 320 can be stored as-is.

Figure 8:
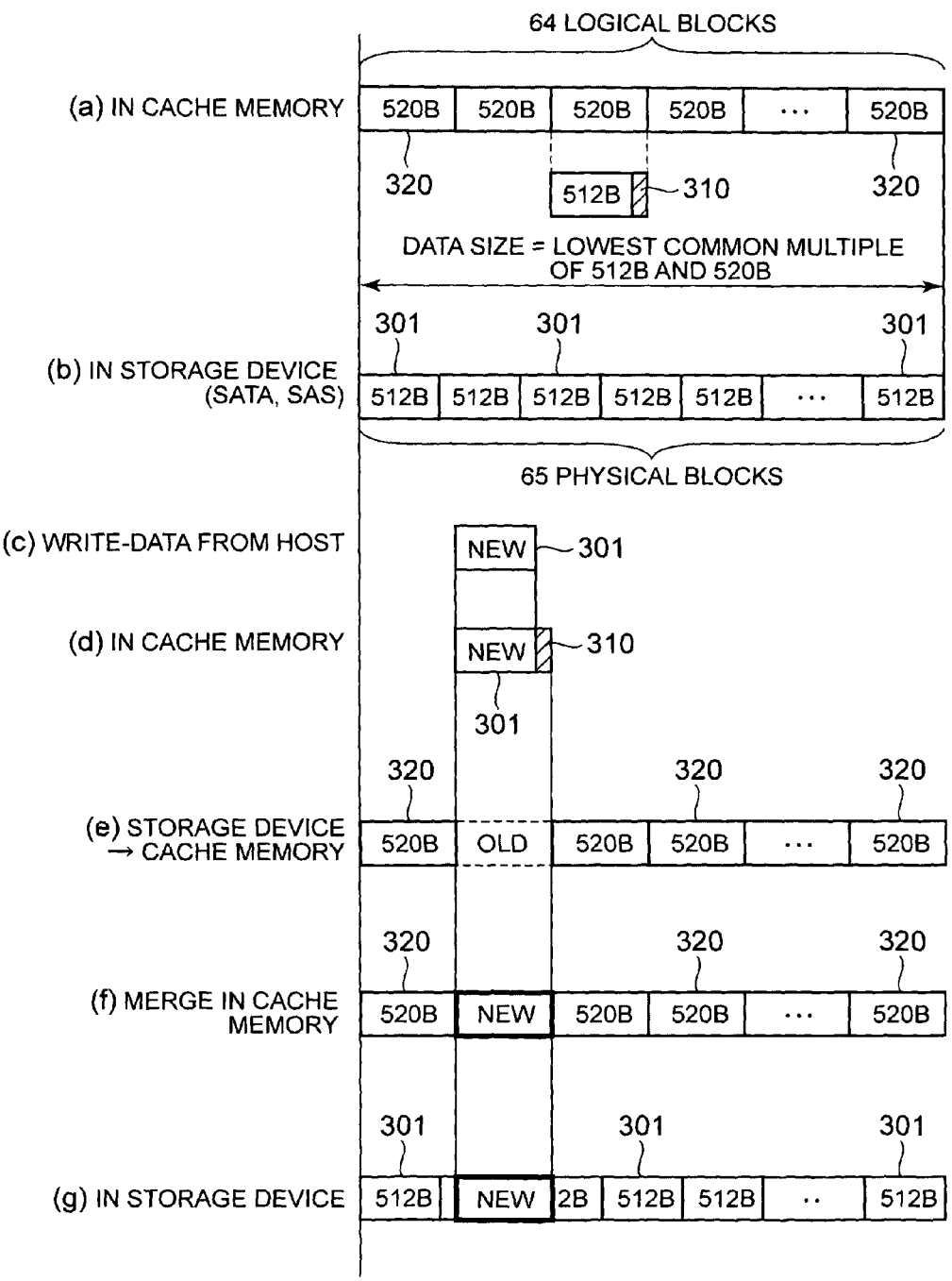
FIG. 8 is a schematic diagram showing how data stored in the storage device is updated on the basis of the lowest common multiple of the size of the logical block and the size of the extended logical block.

FIG. 8 is a diagram schematically showing how to store data of extended logical blocks 320 in a disk having a fixed sector length of 512 bytes, like a SAS disk or SATA disk.

As shown in FIG. 8(a), an extended logical block 320 is created by adding a guarantee code 310 to each logical block 301 of data received from the host 20. Data converted to the extended logical block format is stored in the cache memory 130.

As shown in FIG. 8(b), a storage device 210 like a SAS disk or SATA disk reads and writes data in units of 512 bytes. Therefore, a 520-byte extended logical block 320 cannot be written as-is to the storage device.

Accordingly, the lowest common multiple (33280 bytes) of the size of a logical block 301 (512 bytes) and the size of an extended logical block 320 (520 bytes) is made the data input/output size to the storage device 210. The total size of 64 extended logical blocks 320 (64×520=33280) matches the total size of 65 logical blocks 301 (65×512=33280). Therefore, 64 extended logical blocks 320 can be written to the storage device 210 and read out from the storage device 210 as one unit.

Premised on the above, a read-modify-write process, which makes use of data access that uses the lowest common multiple unit, will be explained. When a logical block comprising updated data (NEW) is received from the host 20 as shown in FIG. 8(c), the CHA 110 creates an extended logical block 320 by adding a guarantee code 310 to the updated-data logical block 301 as shown in FIG. 8(d). Hereinafter, an update-targeted block may be called an update block.

As shown in FIG. 8(e), the DKA 120 reads out the old data (OLD) from the storage device 210, and stores this data in the cache memory 130. As described hereinabove, the data comprising 65 logical blocks is equivalent to the data comprising 64 extended logical blocks. Therefore, the DKA 120 can obtain 64 extended logical blocks worth of data by reading out 65 contiguous logical blocks 301 from the storage device 210.

As shown in FIG. 8(f), new data is placed in the update-targeted extended logical block 320 in the cache memory 130. Thereafter, as shown in FIG. 8(g), the 64 extended logical blocks 320 into which the new data has been stored, are written to the storage device 210 as 65 logical blocks 301.

In RAID 1, the logical block 320 into which the old data has been written is simply rewritten to the logical block 320 in which the new data is stored. When using parity as in RAID 5, a new parity is created from the old data, new data and old parity. The parity is written to the storage device 210 in a unit of 64 extended logical blocks the same as the data.

Figure 9:
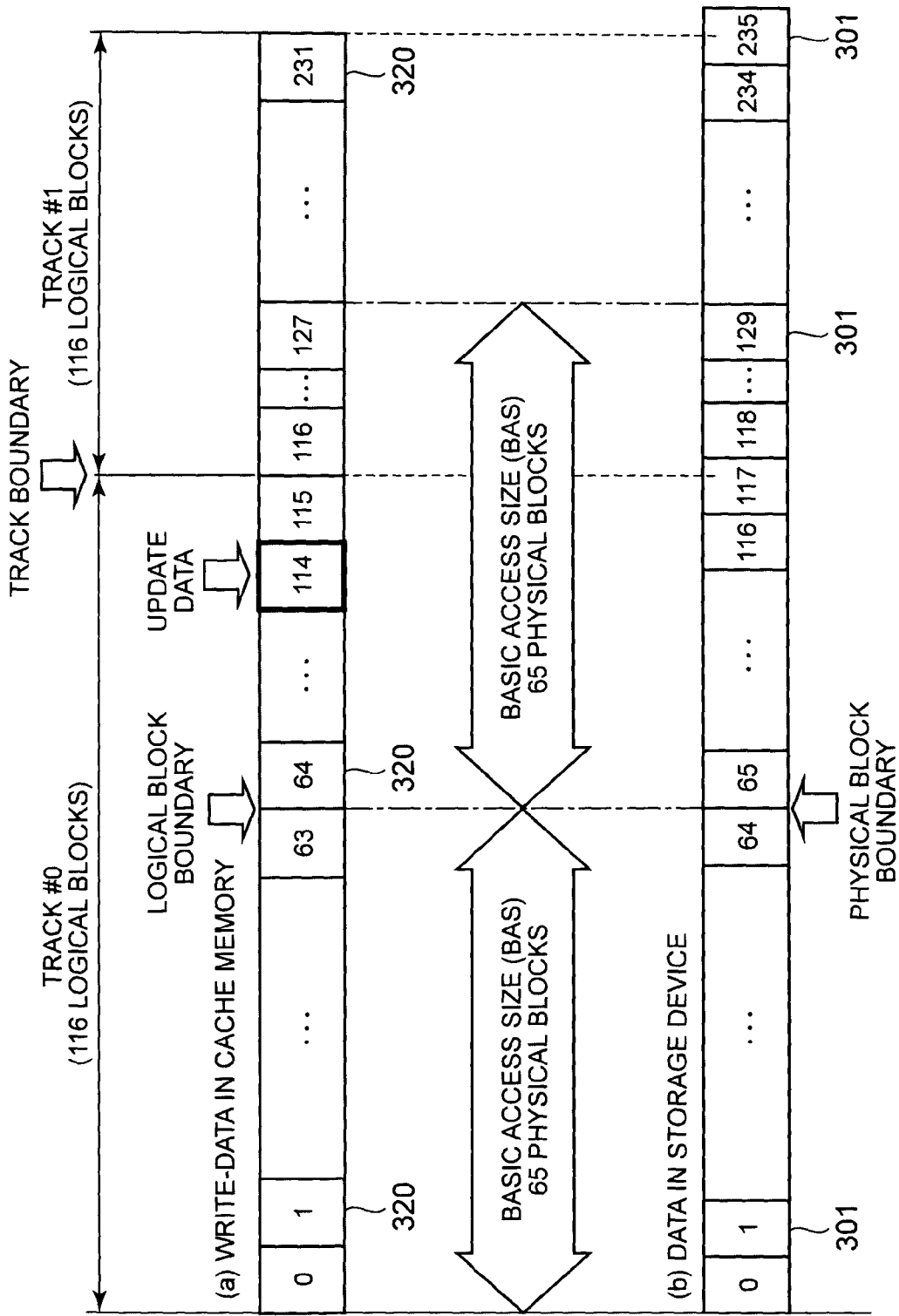
FIG. 9 is a schematic diagram showing how processing is carried out across a plurality of adjacent tracks when a gap is not provided in the storage device.

FIG. 9 is a schematic diagram showing a situation in which the size of the track, which is the basic management unit of the host 20, is not consistent with the lowest common multiple of the logical block size and the extended logical block size. The host 20 can update data in a logical block 301 unit, but the basic unit for managing data in the host 20 is the track. One track is configured from either 96 or 116 logical blocks 301. An example, in which a track is configured from 116 logical blocks and the 114$^{th}$ block is to be updated, will be given in the explanation.

As shown in FIG. 9(a), the cache memory 130 stores data in the extended logical block 320 format. The number of blocks will remain the same at 116, but the data size will increase due to the addition of guarantee codes 310.

To carry out a read-modify-write process, the old data of the update-targeted block must be read out from the cache memory 130. A situation, in which 65 logical blocks 301, which comprise the old data, are read out from the storage device 210 using lowest-common-multiple-unit data access, will be considered.

As shown in FIG. 9(b), to read out the old data, the logical blocks 301 from the 65$^{th}$ through the 129$^{th}$ blocks are read out from the storage device 210. However, the 117$^{th}$ through the 129$^{th}$ logical blocks 301 are mapped to track #1. That is, the boundary between track #0, in which the update-targeted logical block 301 (#114) exists, and track #1, which is adjacent to this track #0, does not match up with the boundary of the logical block 301 inside the storage device 210.

Therefore, reading out the data, which exists in the posterior area of track #0 (64$^{th}$ through the 115$^{th}$ extended logical blocks 320) from the storage device 210 using lowest-common-multiple-unit data access will involve carrying out processing that spans the two adjacent tracks #0 and #1.

Figure 10:
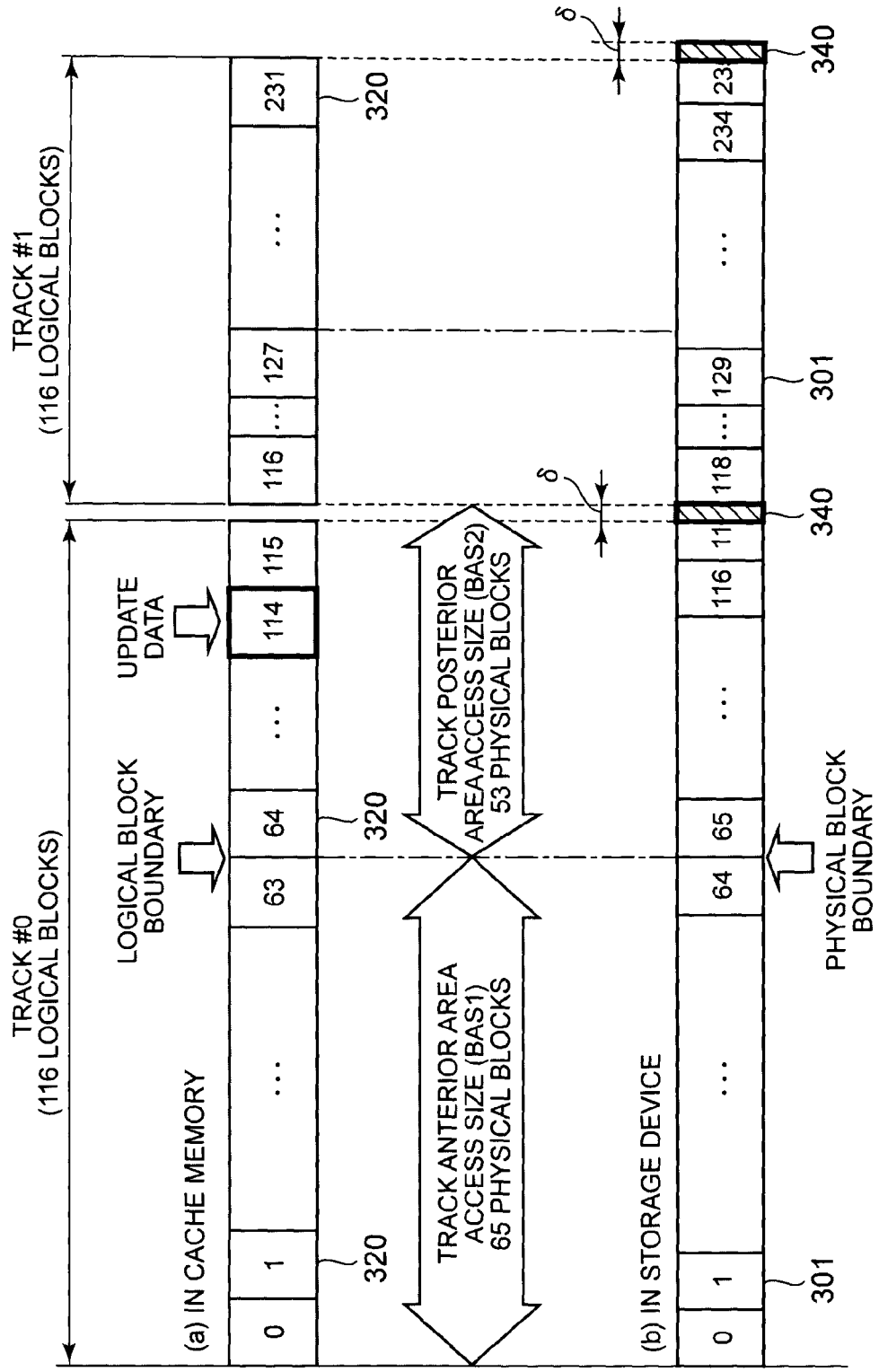
FIG. 10 is a schematic diagram showing how the starting locations at the beginning blocks of the respective tracks are matched up to the logical blocks inside the storage device by providing a prescribed size gap for each prescribed number of logical blocks.

FIG. 10 shows a method for accessing the storage device 210 in accordance with this embodiment. In this embodiment, the start locations of the lead blocks of the respective tracks are matched up with the start locations of the logical blocks inside the storage device 210 by disposing a gap δ of a prescribed size in the storage device 210 every 116 logical blocks. In the example shown in FIG. 10, the size of the gap δ is 96 bytes.

A read-modify-write process according to this embodiment will be explained by referring to FIGS. 11 through 13. Hereinafter, the explanation will focus mainly on RAID 1.

Figure 11:
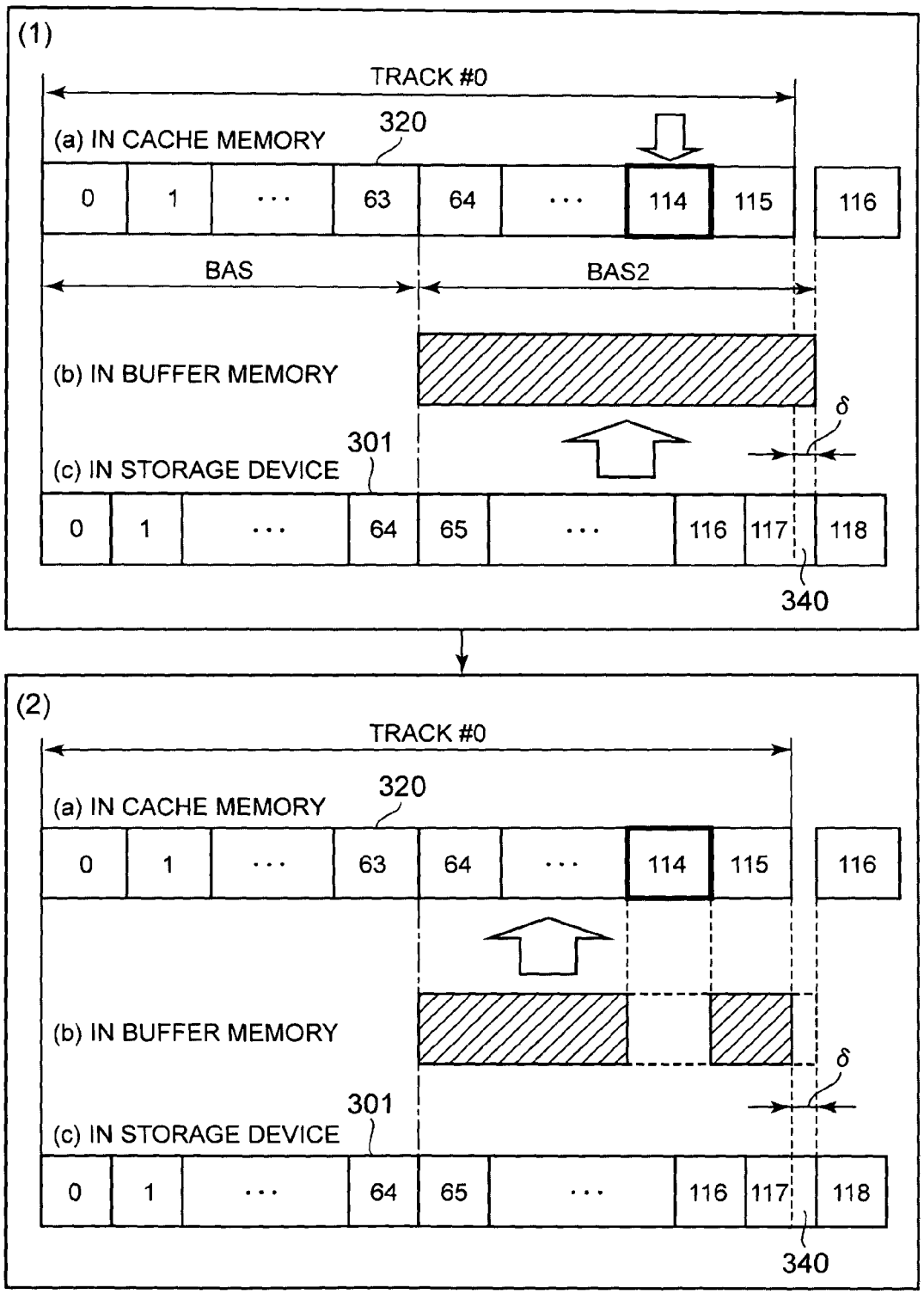
FIG. 11 is a schematic diagram showing how data is transferred from the storage device to the cache memory by way of a buffer memory.

As shown in FIG. 11 (1), when updating the 114$^{th}$ extended logical block 320 of track #0, the data of the posterior area (BAS 2) is read out from the storage device 210, and stored in the buffer memory 122A. In FIG. 11 (1), size δ gap data 340 is stored at the end of the data shown using diagonal lines.

As shown in FIG. 11 (2), the DKA 120 transfers to the cache memory 130 only those parts of the data from which the old data, which corresponds to the update-targeted data, and the gap data 340 have been removed from the data stored in the buffer memory 122A. In (b) of FIG. 11 (2), the scope of the data that is not transferred from the buffer memory 122A to the cache memory 130 is shown using dotted lines.

Figure 12:
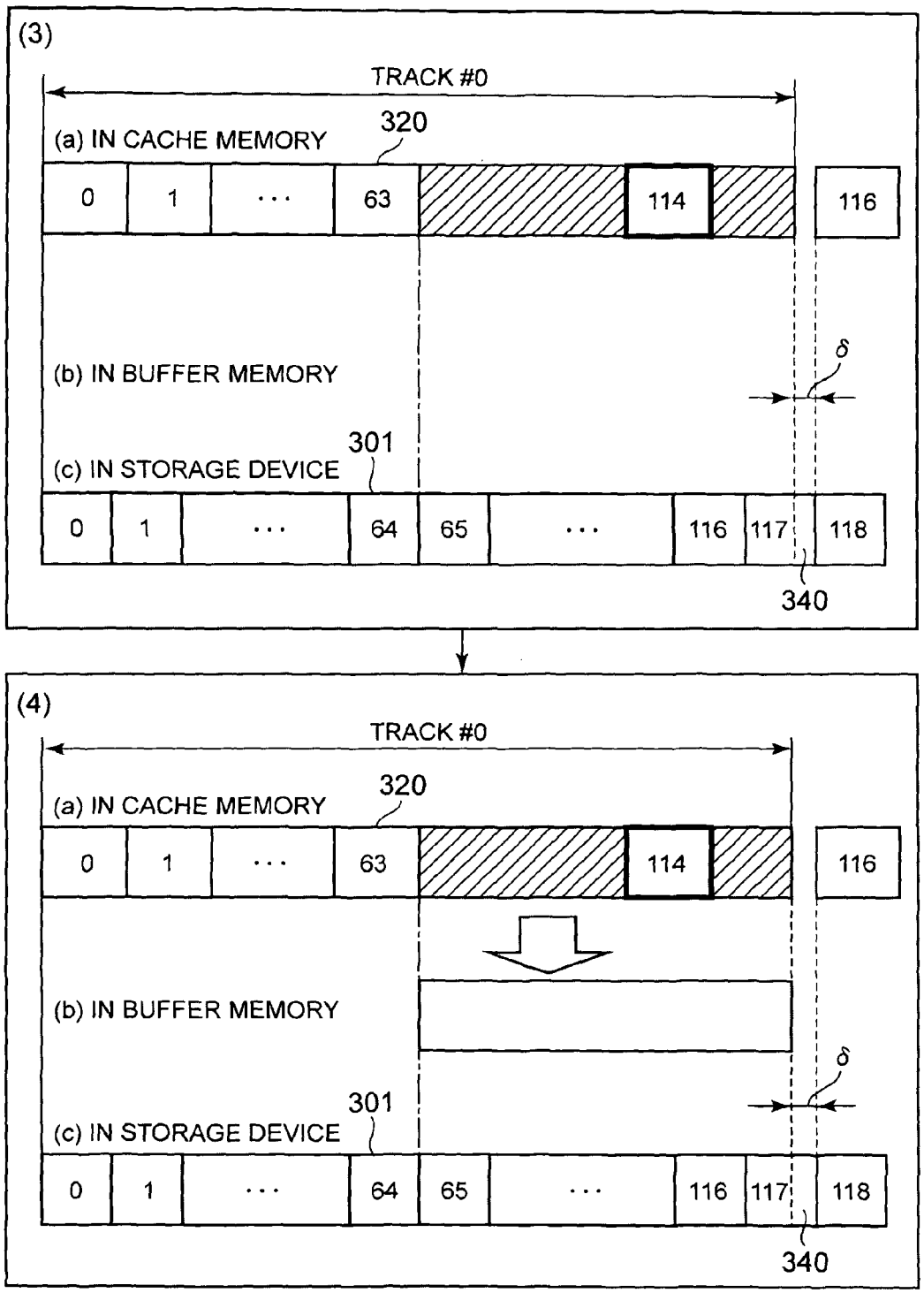
FIG. 12 is a schematic diagram showing how merged data in the cache memory is transferred to the buffer memory.

As shown in FIG. 12 (3), the update-targeted data (data of extended logical block #114) and the data read out from the storage device 210 are merged together inside the cache memory 130.

As shown in FIG. 12 (4), the post-merge data is transferred from the cache memory 130 to the buffer memory 122A.

As shown in FIG. 13 (5), a gap δ worth of data 340 is added at the end of the post-merge data in the buffer memory 122A. That is, gap data 340 is added such that the boundary of the post-merge data (the boundary in the right side of the figure) matches the end location of the logical block 301.

As shown in FIG. 13 (6), the data added in the gap data 340 is transferred to the storage device 210 from the buffer memory 122A, and written into the respective logical blocks 301 (#65 through #117) of the storage device 210.

As described hereinabove, in this embodiment, gap data 340 is added in the buffer memory 122A such that the end of the track matches up with the boundary of the logical block 301 inside the storage device 210.

When the data is read out from the storage device 210, as described using FIG. 11 (1), the gap data 340 is also transferred to the buffer memory 122A. However, as described using FIG. 11 (2), the gap data 340 remains in the buffer memory 122A and is not transferred to the cache memory 130. Since the gap data 340 is not transferred to the cache memory 130, this gap data 340 is not used by the host 20. Therefore, all the values of the gap data 340 can be "0" and there is no need to stipulate a particular value.

Figure 14:
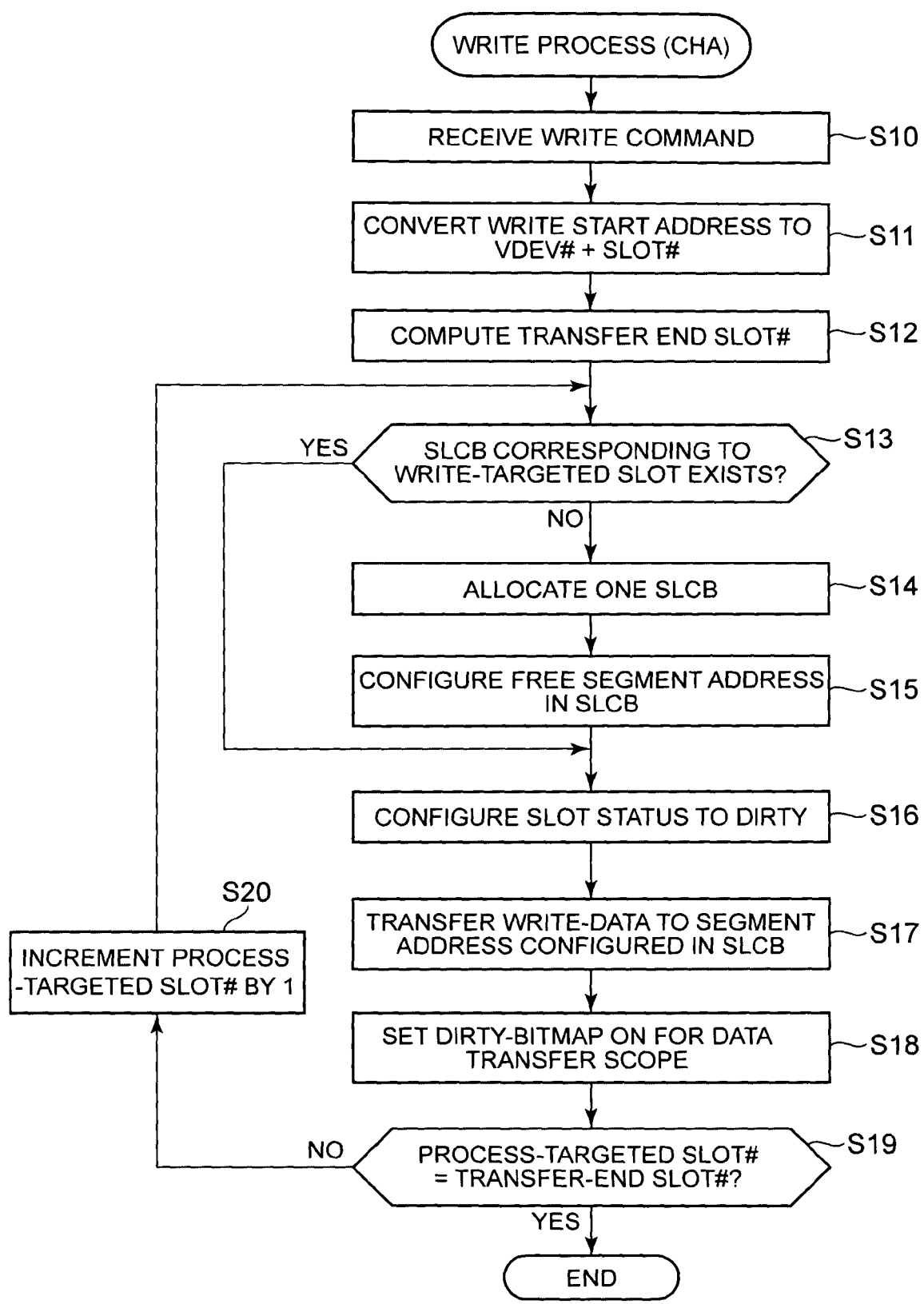
FIG. 14 is a flowchart showing a write process.

The operation of this embodiment will be explained based on FIGS. 14 through 18. FIG. 14 is a flowchart showing a write command process. This process is executed by the CHA 110.

The CHA 110, upon receiving a write command from the host 20 (S10), converts the write-start address to a combination of the VDEV number and slot number (S11). The write command specifies the logical device ID, write-start address, and write-size. Therefore, the CHA 110 specifies the write-targeted VDEV number by referencing the device ID-VDEV correspondence management table T20 based on the specified device ID. Furthermore, the CHA 110 can detect the write-targeted slot number by referencing the VDEV management table T30 based on the specified VDEV number.

The CHA 110 computes the transfer-end slot number (S12). The transfer-end slot number is the final slot number of the write-data. The CHA 110 can determine the final slot number of this write-data by dividing a value arrived at by adding the write-size to the write-start address by the slot size.

The CHA 110 determines whether or not a SLCB mapped to the write-targeted slot already exists (S13). That is, the CHA 110 determines whether or not a cache memory 130 segment 131 has been allocated to the write-targeted slot (S13).

When a SLCB has not yet been allocated to the write-targeted slot (S13: NO), the CHA 110 allocates one SLCB to this write-targeted slot (S14). The CHA 110 configures the address of a free segment 131 in this allocated SLCB (S15). Consequently, the write-targeted slot is mapped to the segment 131, and preparations are complete for storing the data of the write-targeted slot in the cache memory 130.

When a SLCB has already been allocated to the write-targeted slot (S13: YES), S14 and S15 are skipped, and processing moves to S16.

The CHA 110 configures the slot status of the write-targeted slot to dirty prior to receiving the write-data (S16). Next, the CHA 110 transfers the write-data (the data for the write-targeted slot) received from the host 20 to the segment address allocated to the write-targeted slot (S17). Consequently, the write-data received from the host 20 is stored in the prescribed segment inside the cache memory 130.

Furthermore, when the write-data received from the host 20 is transferred to and stored in the prescribed segment inside the cache memory 130, a guarantee code 310 is respectively added to each logical block 301 in this write-data. Therefore, the write-data is stored in the cache memory 130 in the extended logical block 320 format.

The CHA 110 configures the dirty-bitmap to ON ("1") for the logical block 301 updated by the write-data (S18). Consequently, it is possible to manage the logical block 301 inside this write-targeted slot in which the updated data is stored.

The CHA 110 determines whether or not the number of the slot targeted in this process matches the transfer-end slot number determined in S12 (S19). When the process-targeted slot number and the transfer-end slot number do not match (S19: NO), the CHA 110 increments by one the process-targeted slot number (S20), and returns to S13. When both slot numbers are a match (S19: YES), this processing ends.

When the host 20 writes write-data to a plurality of contiguous slots, that is, when the host 20 carries out a sequential write, S13 through S19 are executed repeatedly in accordance with the number of slots. When the host 20 updates either one or a plurality of logical blocks 301 inside one slot, S13 through S19 are executed only once each.

A destage process will be explained based on FIG. 15. The destage process is for writing the data in the cache memory 130 to the storage device 210. The destage process is executed by the DKA 120.

In the destage process, as described using FIGS. 11 through 13, the old data in the update-targeted track (update-targeted slot) is read out (FIG. 11), the update data received from the host 20 is merged with the old data (FIG. 12), and this merged data is written to the storage device 210 (FIG. 13).

The buffer memory 122A is used to transfer the data between the cache memory 130 and the storage device 210. A boundary correction process is implemented in this buffer memory 122A to make the data boundaries uniform. Therefore, the boundary correction process is executed both when the old data is transferred from the storage device 210 to the cache memory 130 (first boundary correction process), and when the merged data is transferred from the cache memory 130 to the storage device 210 (second boundary correction process).

Furthermore, when all the blocks of the update-targeted track are to be updated, there is no need to read out the old data from the storage device 210. The example used in the explanation here is of a situation in which a number of blocks inside the track are updated.

The DKA 120 accesses the SLCB inside the shared memory 140, and checks whether or not there is an SLCB in which the slot status is configured as dirty. If the DKA 120 detects an SLCB in which the slot status has been configured as dirty (S30), the DKA 120 acquires the slot number and VDEV number from this SLCB (S31).

On the basis of the VDEV number, the DKA 120 references the VDEV management table T30 and acquires the disk type of this VDEV. The DKA 120 determines whether or not this disk type is an FC disk (S32).

When the disk type is not FC disk (S32: NO), the size of the extended logical block 320 inside the cache memory 130 will not match the size of the logical block 301 inside the storage device 210.

Accordingly, the DKA 120 executes the first boundary correction process to make the boundary of the old data read out from the storage device 210 match up with the boundary of the extended logical block 320 inside the cache memory 130 (S33). This first boundary correction process will be explained in detail hereinbelow using FIG. 16.

Subsequent to the end of the first boundary correction process, the DKA 120 carries out a destage process for both the primary disk (primary storage device) and secondary disk (secondary storage device) (S34). In this destage process, data is written from the cache memory 130 to the storage device 210 by way of the buffer memory 122A. The second boundary correction process is executed when the data is transferred from the buffer memory 122A to the storage device 210. The destage process (S34) will be explained in detail hereinbelow using FIG. 18.

Now then, when the disk type is FC disk (S32: YES), the DKA 120 executes a destage process for the FC disk (S35). As described in FIG. 7, the sector length of the FC disk can be configured to 520 bytes.

Therefore, the size of the extended logical block 320, which is the data management unit inside the cache memory 130, matches the data input/output unit of the FC disk 210. For this reason, data can be transferred between the FC disk and the cache memory 130 without carrying out a boundary correction process. Therefore, further explanation of the FC disk destage process will be omitted.

Furthermore, in a different embodiment, which will be explained hereinbelow, carrying out a boundary correction process inside the storage device 210 enables a disk other than a FC disk (such as a SAS disk or SATA disk) to be used the same as an FC disk.

Figure 15:
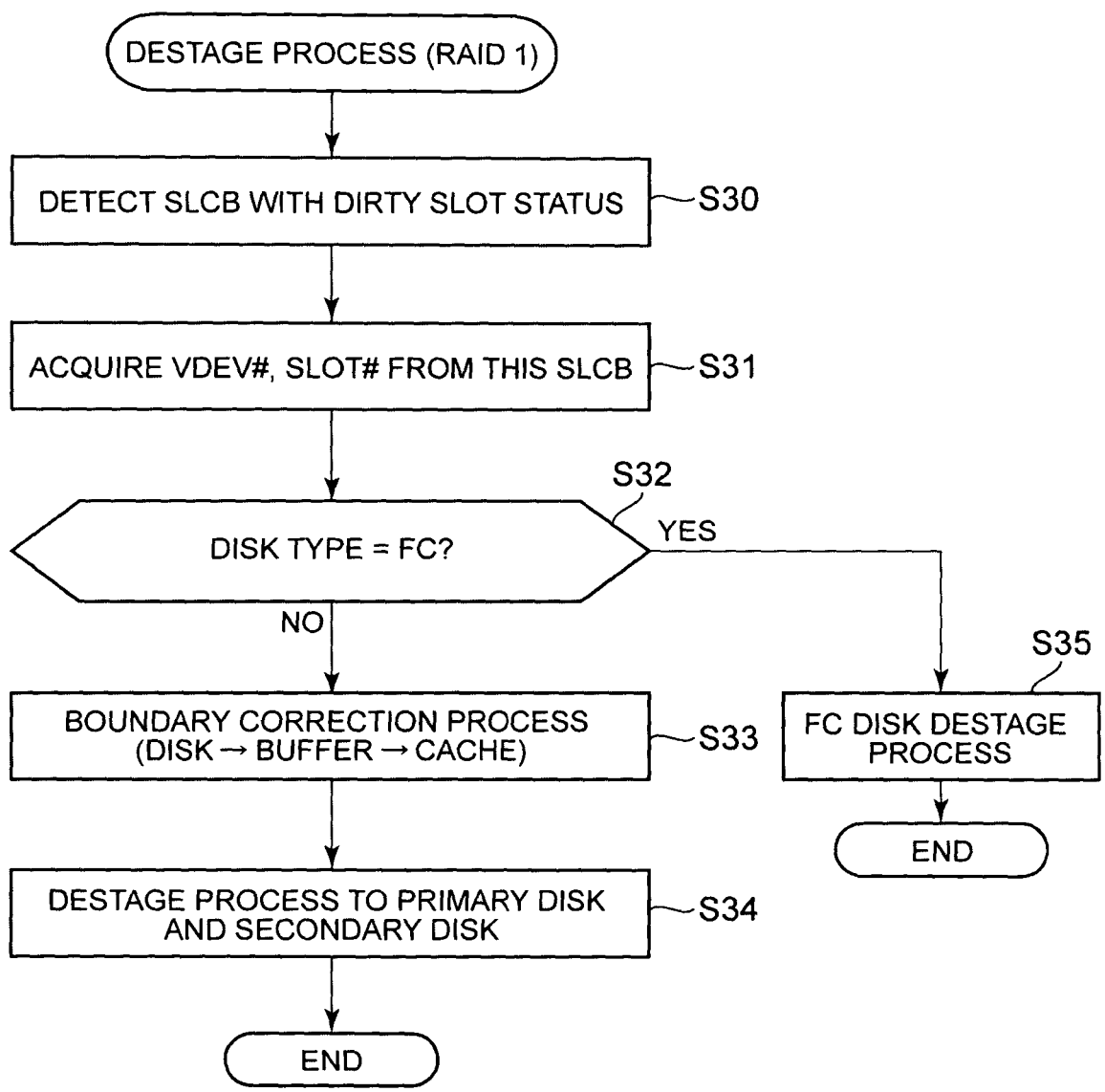
FIG. 15 is a flowchart showing a destage process in the case of RAID 1.
Figure 16:
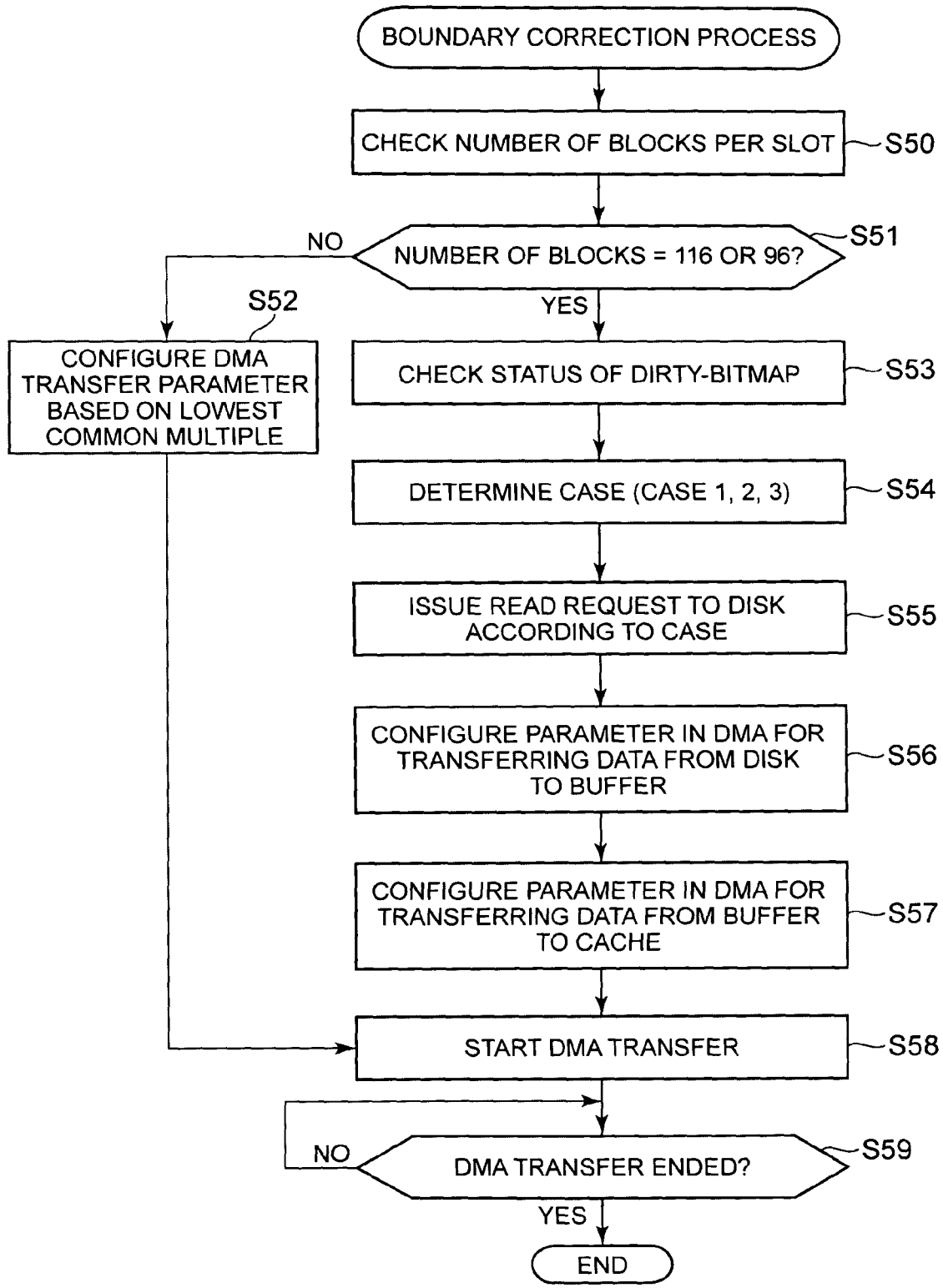
FIG. 16 is a flowchart showing the details of S33 of FIG. 15.

FIG. 16 is a flowchart showing the details of the boundary correction process presented in S33 of FIG. 15. This boundary correction process corrects the data boundaries when data is transferred from the storage device 210 to the cache memory 130.

The DKA 120 checks the number of logical blocks configuring the slot (S50), and determines if the number of logical blocks configuring one slot is either 96 block or 116 blocks (S51).

As mentioned hereinabove, in a mainframe, one slot (a track) is configured from either 96 or 116 logical blocks. In the case of an open system host, one slot is configured from either 128 or 512 logical blocks.

When the number of logical blocks per slot is neither 96 nor 116 blocks (S51: NO), the DKA 120 configures a DMA 122 transfer parameter on the basis of the lowest common multiple of the size of the logical block 301 and the size of the extended logical block 320 (S52). That is, the DKA 120 transfers the data from the storage device 210 to the cache memory 130 by treating 65 logical blocks 301 as one unit (S58).

When the number of logical blocks per slot is either 96 or 116 (S51: YES), the DKA 120 references the SLCB of the transfer-targeted slot, and checks the status of the dirty-bitmap configured in this SLCB (S53).

On the basis of the dirty-bitmap status, the DKA 120 determines if a data transfer from the storage device 210 to the cache memory 130 corresponds to any of a plurality of pre-configured cases (S54).

Figure 17:
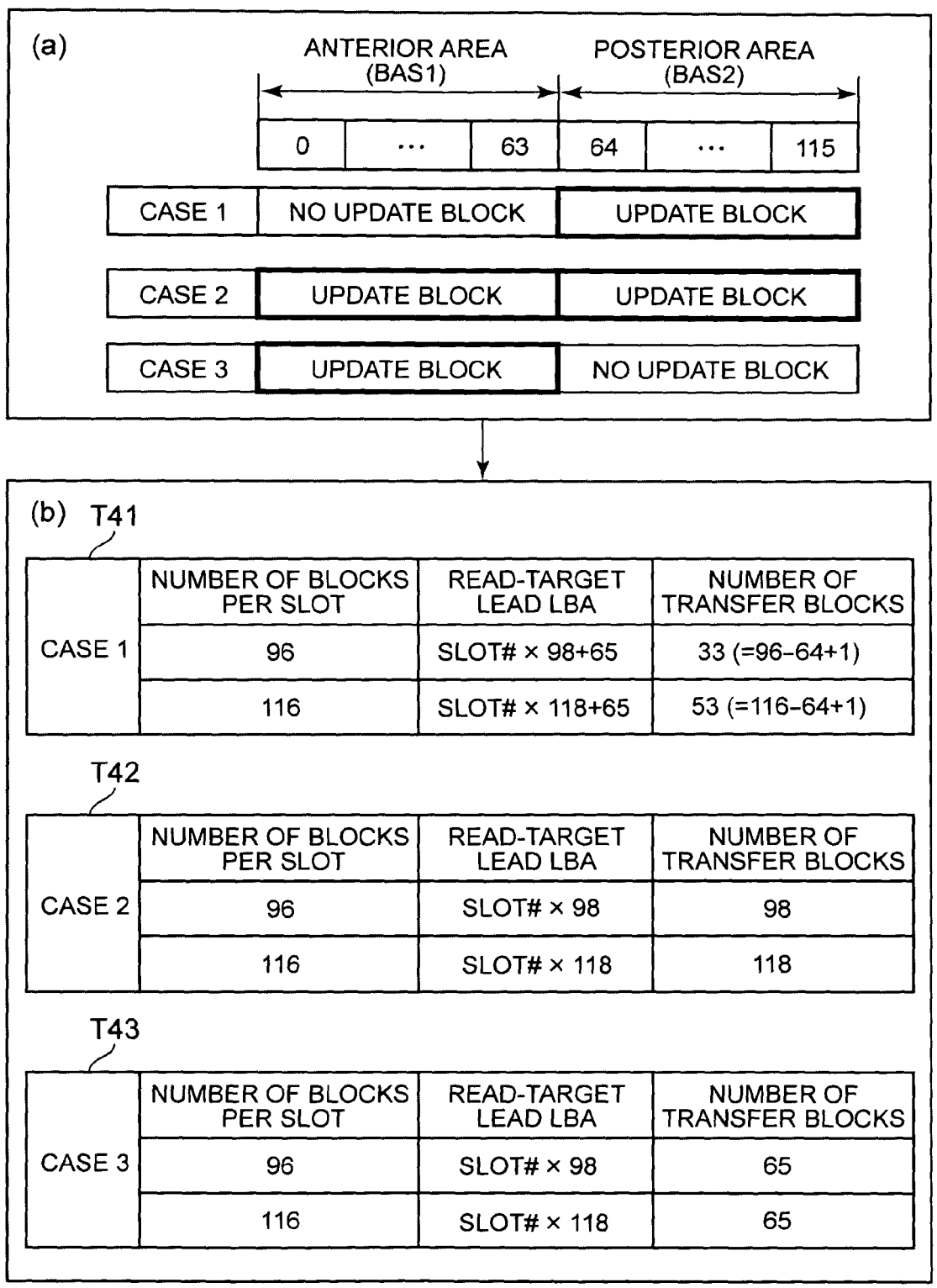
FIG. 17 is a schematic diagram showing how cases are divided in accordance with the update location in a track, and how transfer parameters are decided in accordance with the respective cases.

Refer to FIG. 17. FIG. 17 is a schematic diagram showing how a DMA 122 transfer parameter is configured in accordance with a case. FIG. 17(*a*) shows a plurality of cases classified in accordance with the location of the update-targeted block.

As described hereinabove, a track can be broadly divided into an anterior area (BAS1) data-accessible using a lowest-common-multiple unit, and a posterior area (BAS2), which follows after the anterior area. Accordingly, in this embodiment, a DMA transfer is handled by dividing the transfer process into cases in accordance with where the update-targeted logical block is located in the track.

Case 1 is a situation in which an update-targeted logical block exists only in the posterior area of the track (#64 through #115). Case 2 is when update-targeted logical blocks exist in both the anterior area (#0 through #63) and posterior area of the track. Case 3 is when an update-targeted logical block exists only in the anterior area of the track.

In this embodiment, gap data 340 is added to the last block in the track to make the block boundary inside the storage device 210 match the beginning of the track. Therefore, in Case 1 and Case 2, the existence of this gap data 340 must be taken into consideration. By contrast, since the update-targeted block exists only in the anterior area of the track in Case 3, data can be transferred via a lowest-common-multiple-unit data access without taking the gap data 340 into account.

FIG. 17(b) is a schematic diagram showing tables T41 through T43 for managing the transfer parameters configured in the DMA 122 for each case. Table T41 is for managing a transfer parameter for Case 1, Table T42 is for managing a transfer parameter for Case 2, and Table T43 is for managing a transfer parameter for Case 3. The following explanation will focus mainly on a situation in which there are 116 blocks per slot.

Table T41 manages the leading LBA of the read target and the number of transfer blocks in accordance with the number of blocks per slot. The LBA is the logical block address. When there are 96 blocks per slot, the read-target lead LBA is determined by adding 65 to a value arrived at by multiplying the slot number by 98. When there are 116 blocks per slot, the read-target lead LBA is determined by adding 65 to a value arrived at by multiplying the slot number by 118.

When there are 116 extended logical blocks per slot, the number of logical blocks inside the storage device 210 corresponding to this slot is 118. Then, 65 logical blocks 301 correspond to 64 extended logical blocks 320.

In Case 1, in which the update-targeted block exists in the posterior area of the track, the data must be read out from the beginning of the posterior area. The posterior area begins from logical block #65 and ends at logical block #117 inside the storage device. Therefore, the lead LBA of the posterior area of the target track can be determined by multiplying the slot number by 118 and adding 65.

For example, the lead LBA of the posterior area of the initial track #0 is determined as 0×118+65=65. The lead LBA of the posterior area of the second track #1 is determined as 1×118+65=183.

In Case 1, the data of the posterior area is transferred from the storage device 210 to the cache memory 130. Since the size of the posterior area inside the storage device 210 is configured from 53 logical blocks 301, 53 is configured as the number of transfer blocks.

In Case 2, in which update-targeted blocks exist in both the anterior area and posterior area of the track, the lead LBA of the read target is configured as a value arrived at by multiplying the slot number by the number of logical blocks configuring this slot. When there are 116 extended logical blocks per slot, the lead LBA is determined by multiplying the slot number by 118. In Case 2, since all the data in the track must be transferred to the cache memory 130, the number of transfer blocks in configured at 118.

In Case 3, in which the update-targeted block exists only in the anterior area of the track, the data of the anterior area is read out from the storage device 210 and transferred to the cache memory 130. Therefore, the lead LBA is determined by multiplying the slot number by the number of logical blocks corresponding to the track. Since only the data of the anterior area of the track needs to be read out, the number of transfer blocks is configured to 65.

Thus, in this embodiment, the transfer parameter to be utilized in a DMA transfer is prepared beforehand on a by-case basis in accordance with the track update location.

Return to FIG. 16. After determining the case (S54), the DKA 120 issues a read request to the storage device 210 in accordance with the determined case (S55). The DKA 120 specifies the read-target lead LBA and number of transfer blocks, and requests a data-read from the storage device 210.

The DKA 120 configures in the DMA 122 a parameter for transferring the data from the storage device 210 to the buffer memory 122A (S56). The DKA 120, for example, configures in the DMA 122 a data-transfer-destination address (a buffer memory address) and a number of transfer bytes. The number of transfer bytes constitutes a value arrived at by multiplying the number of transfer blocks by 512.

The DKA 120 configures in the DMA 122 a parameter for transferring the data from the buffer memory 122A to the cache memory 130 (S57). The DKA 120, for example, respectively configures in the DMA 122 a buffer memory 122A address constituting the transfer source, a cache memory 130 address (segment address) constituting the transfer destination, a number of transfer bytes, and a dirty-bitmap status.

The number of transfer bytes when there are 116 blocks per slot becomes (52×520) bytes for Case 1, (116×520) bytes for Case 2, and (64×520) bytes for Case 3. The number of transfer bytes when there are 96 blocks per slot becomes (32×520) bytes for Case 1, (96×520) bytes for Case 2, and (64×520) bytes for Case 3.

Configuring the number of transfer bytes as described hereinabove, results in the gap data 340 not being transferred from the buffer memory 122A to the cache memory 130 as shown in FIG. 11 (2) and FIG. 12 (3).

This is because configuring the dirty-bitmap status in the DMA 122 does not allow the scope of data to be updated to be transferred from the buffer memory 122A to the cache memory 130. That is, the new data received from the host 20 is prevented from being overwritten by the old data read out from the storage device 210. Therefore, the DMA 122 does not transfer data from the buffer memory 122A to the cache memory 130 for a block that has "1" configured in the dirty-bitmap.

Furthermore, in the case of RAID 5, which will be explained hereinbelow, the old data is also transferred from the buffer memory 122A to the cache memory 130 due to the need to create new parity. Therefore, in RAID 5, there is no need to configure the status of the dirty-bitmap in the DMA 122.

A DMA transfer is started when the transfer parameter is configured in the DMA 122 by S56 and S57 (S58). The DKA 120 transitions to standby until the DMA transfer from the buffer memory 122A to the cache memory 130 has ended (S59). When the DMA transfer is over (S59: YES), the boundary correction process ends.

Figure 18:
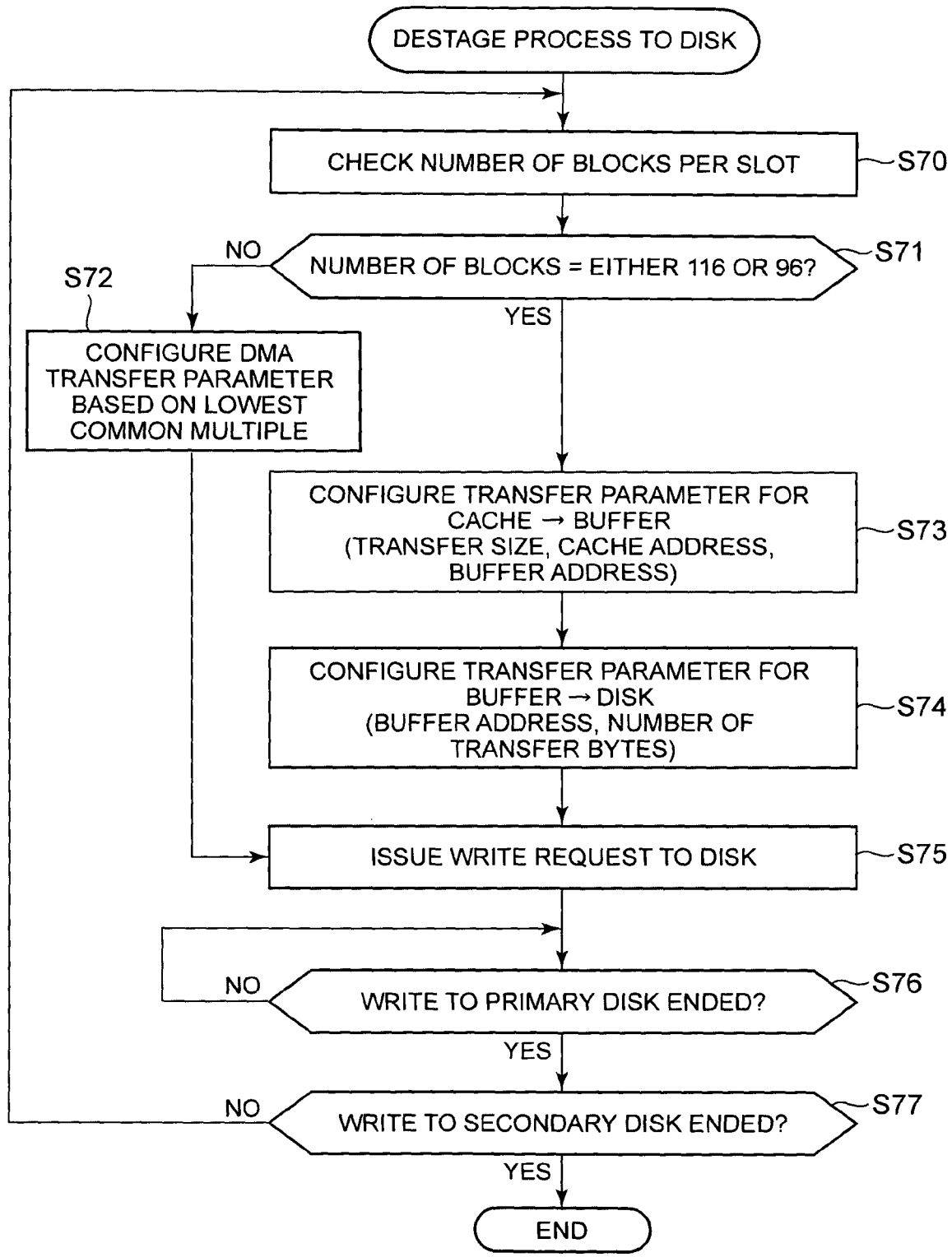
FIG. 18 is a flowchart showing the details of S34 of FIG. 15.

FIG. 18 shows the details of the destage process presented in S34 of FIG. 15. In this destage process, the data is transferred from the cache memory 130 to the storage device 210 by way of the buffer memory 122A.

The DKA 120 checks the number of extended logical blocks configuring one slot (S70), and determines if there are either 96 or 116 extended logical blocks per slot (S71). When the number of blocks per slot is neither 96 nor 116 (S71: NO), the DKA 120 configures a transfer parameter in the DMA 122 on the basis of lowest-common-multiple-unit data access (S72). This is because data can be transferred in a lowest-common-multiple unit when there are either 128 blocks or 512 blocks per slot (S71: NO).

When there are either 96 or 116 extended logical blocks per slot (S71: YES), the DKA 120 configures a parameter in the DMA 122 for transferring the data from the cache memory 130 to the buffer memory 122A (S73). The DKA 120, for example, configures in the DMA 122 a transfer-source cache address, a transfer-destination buffer memory address, and a number of transfer bytes. The dirty-bitmap status does not have to be configured in the DMA 122.

The number of transfer bytes when there are 116 blocks per slot becomes (52×520) bytes for Case 1, (116×520) bytes for Case 2, and (64×520) bytes for Case 3. The number of transfer bytes when there are 96 blocks per slot becomes (32×520) bytes for Case 1, (96×520) bytes for Case 2, and (64×520) bytes for Case 3.

The DKA 120 configures a parameter in the DMA 122 for transferring data from the buffer memory 122A to the storage device 210 (S74). The DKA 120 configures in the DMA 122 a transfer-source buffer memory 122A address, a transfer-destination storage device address, and a number of transfer blocks.

The transfer-destination storage device address is configured to the same value as the read-target lead LBA described used FIG. 17. The number of transfer blocks is also configured to the same value as the number of transfer blocks described using FIG. 17 (S74).

Configuring the number of transfer blocks the same is described using FIG. 17 makes it possible to add gap data 340 at the end of the data, and to write this data to the storage device 210 as shown in FIGS. 13 (5) and 13 (6). The gap data 340 can be all 0 bits (0 padding), and it can be an indefinite value.

This is because the gap data 340 is only used for making the start location of the track lead block match the start location of the logical block inside the storage device, and is not transferred to the cache memory 130.

The DKA 120, upon completing the configuration to the DMA 122, issues a write request to the primary disk (the primary storage device 210) (S75). The DKA 120 transitions to standby until the data is transferred from the buffer memory 122A to the primary storage device 210 by the DMA 122 (S76).

When the data transfer to the primary storage device 210 has ended (S76: YES), the DKA 120 transfers the same data to the secondary storage device 210 by repeating steps S70 through S76. When the data transfer to the secondary storage device 210 has ended (S77: YES), the destage process ends.

When destaging the data inside the cache memory 130 to the secondary storage device 210, there is no need to carry out the processing described in S33 of FIG. 15. This is because the same data is respectively written to both the primary and secondary storage devices 210.

Configuring this embodiment like this makes it possible to store an extended logical block 320 to which a guarantee code 310 has been added in a storage device 210 having a fixed block size of 512 bytes.

Furthermore, in this embodiment, when the lowest common multiple of the size of the logical block 301 and the size of the extended logical block 320 does not match the track size, which is the host 20 management unit, a write process can be carried out using only data corresponding to the track having the update-targeted block, doing away with the need to carry out a write process that extends across a plurality of adjacent tracks.

Therefore, in this embodiment, there is no need to stand by until a command process related to the adjacent track has ended. Furthermore, in this embodiment, it is possible to prevent the increased utilization of the cache memory 130, and to curb the degradation of the cache hit ratio. Eliminating wait time and preventing a drop in the cache hit ratio can prevent the degradation of storage controller 10 throughput.

In this embodiment, since boundary correction is carried out using the DMA 122 and buffer memory 122A inside the DKA 120, processing can be carried out more efficiently than when boundary correction is carried out in the cache memory 130.

Embodiment 2

A second embodiment of the present invention will be explained based on FIGS. 19 through 22. The following embodiments, to include this embodiment, correspond to variations of the first embodiment. In this embodiment, the processing of a plurality of contiguous tracks will be explained.

Figure 19:
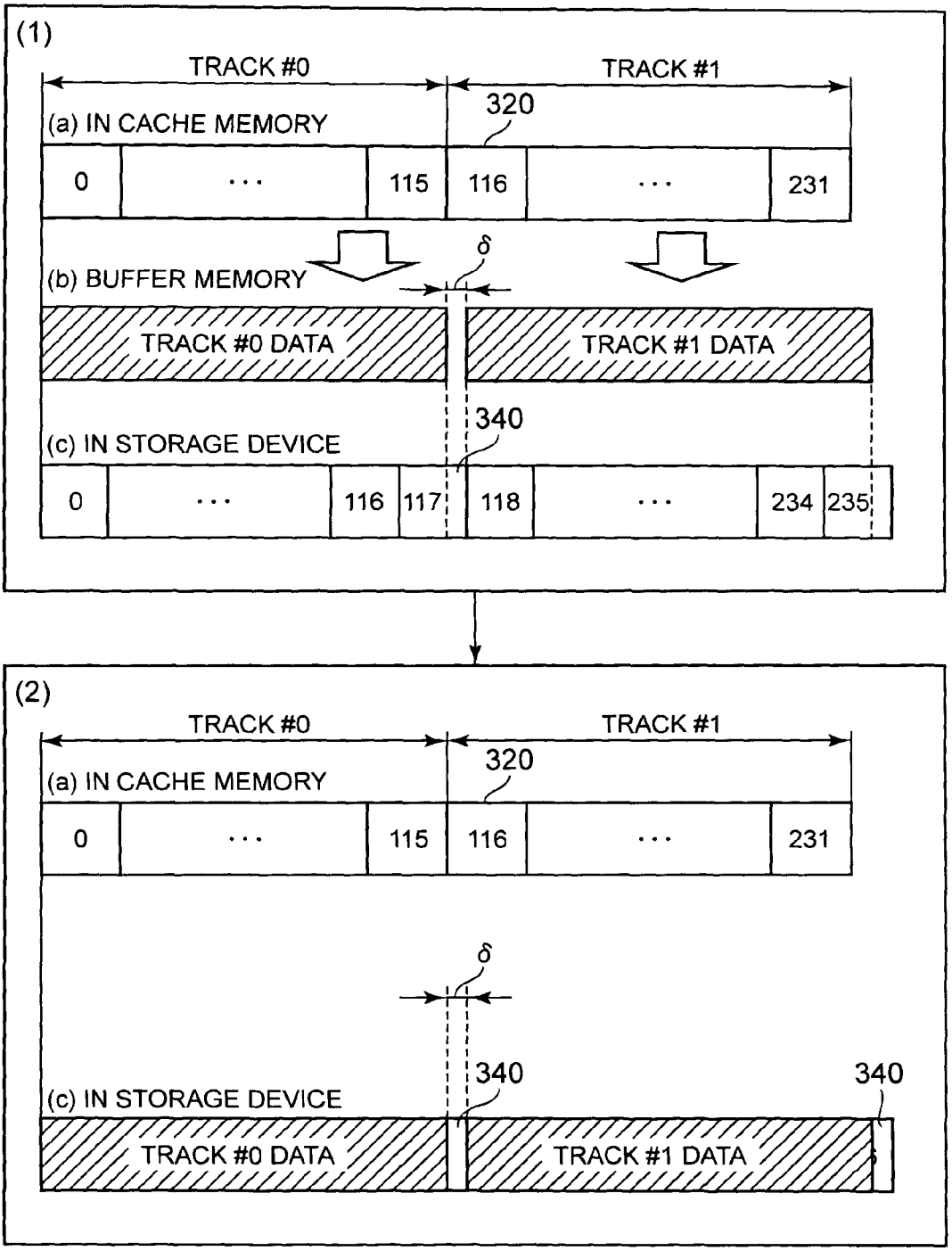
FIG. 19 is a schematic diagram showing how data on contiguous tracks is transferred from cache memory to the storage device by way of the buffer memory in a storage controller related to a second embodiment.

FIG. 19 shows how to transfer the data of a plurality of contiguous tracks from the cache memory 130 to the storage device 210. As shown in FIG. 19 (1) (b), gap data 340 is inserted at the end of track #0 in the buffer memory 122A. Therefore, as shown in FIG. 19 (2) (c), the gap data 340 is also written to the logical block 301 of the storage device 210. Consequently, the start location of the lead block of track #1 matches the start location of the logical block.

FIG. 20 shows how to transfer data of a plurality of contiguous tracks from the storage device 210 to the cache memory 130. As shown in FIG. 20 (1), the data of a plurality of tracks is transferred from the storage device 210 to the buffer memory 122A. This data comprises gap data 340.

As shown in FIG. 20 (2), data, from which the gap data 340 has been removed, is transferred from the buffer memory 122A to the cache memory 130. Configuring the transfer-source address and number of transfer bytes to a suitable value makes it possible to transfer only the data itself to the cache memory 130 without transferring the gap data 340 to the cache memory 130.

Figure 21:
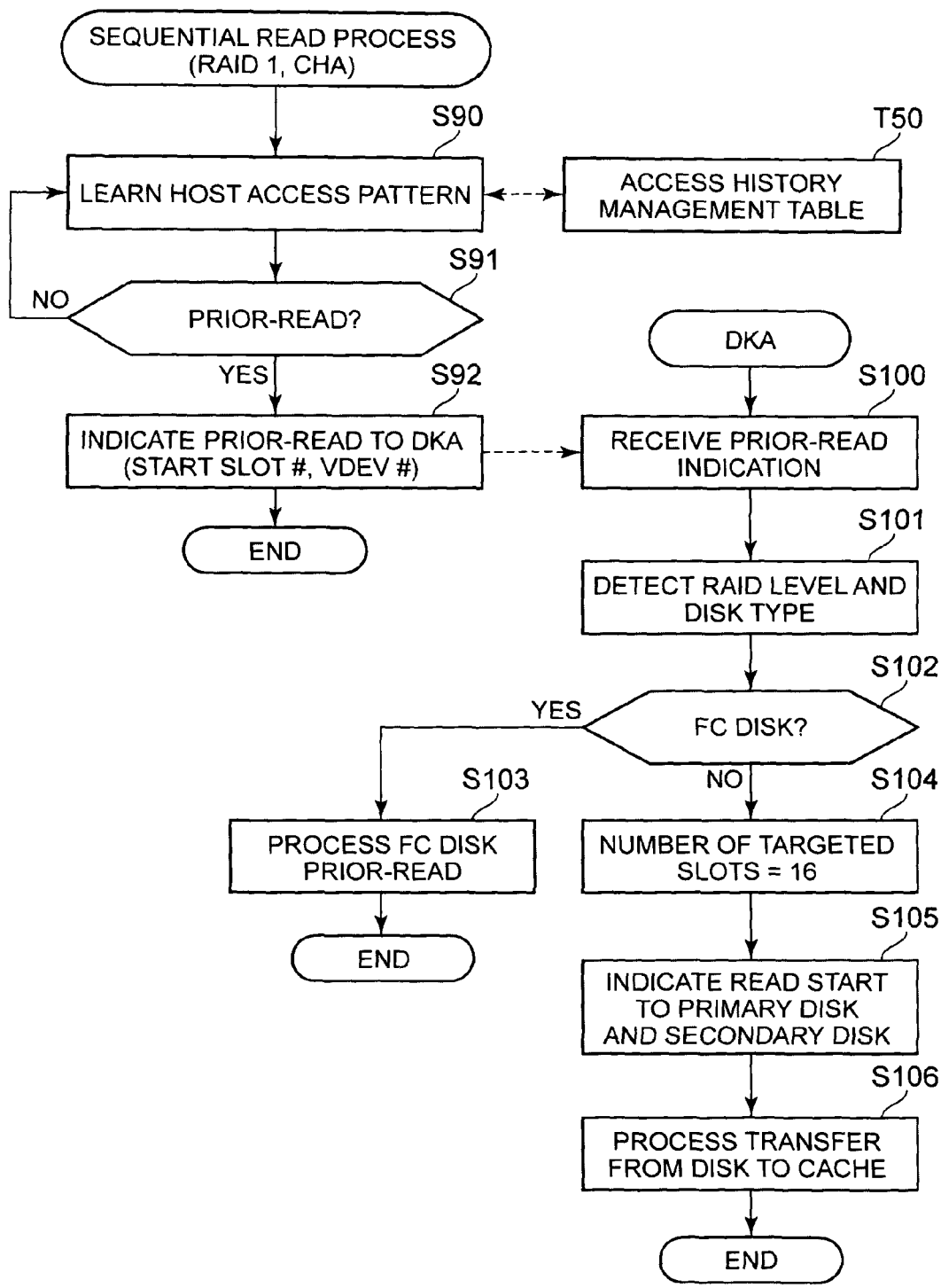
FIG. 21 is a flowchart showing a sequential read process.

FIG. 21 is a flowchart showing a sequential read process. The CHA 110 monitors the access pattern of the host 20, and stores the host 20 access history in an access history management table T50 (S90). The access history management table T50, for example, manages a host ID; device ID; access time; command type; and number of slots (number of tracks).

The CHA 110 determines whether or not to carry out a prior-read based on access pattern learning results (S91). A prior-read is a process for reading data from the storage device 210 and storing this data in the cache memory 130 prior to receiving a request from the host 20. When it is possible to predict that data will be read out sequentially, the CHA 110 will decide to execute a prior-read process (S91: YES), and indicate to the DKA 120 to start the prior-read process (S92).

The indication from the CHA 110 to the DKA 120, for example, comprises the lead slot number and VDEV number where the read will start.

The DKA 120, upon receiving the indication from the CHA 110 (S100), references the VDEV management table T30 on the basis of the specified VDEV number, and detects the table RAID level and disk type (S101).

The DKA 120 determines whether or not the prior-read-targeted storage device 210 is an FC disk (S102). When the prior-read-targeted storage device 210 is an FC disk (S102: YES), the DKA 120 executes a prior-read process for the FC disk (S103). Since the sector length of the FC disk can be made to match the size of the extended logical block 320 as was explained hereinabove, there is no need to correct the data boundaries.

When the prior-read-targeted storage device 210 is not an FC disk (S102: NO), the DKA 120 configures 16 for the number of prior-read-targeted slots (S104), and indicates the start of a read to both the primary storage device and the secondary storage device (S105). The DKA 120 splits the number of prior-read-targeted slots, reads out data from eight slots in each of the primary and secondary storage devices, and transfers this data to the cache memory 130 (S106).

Figure 22:
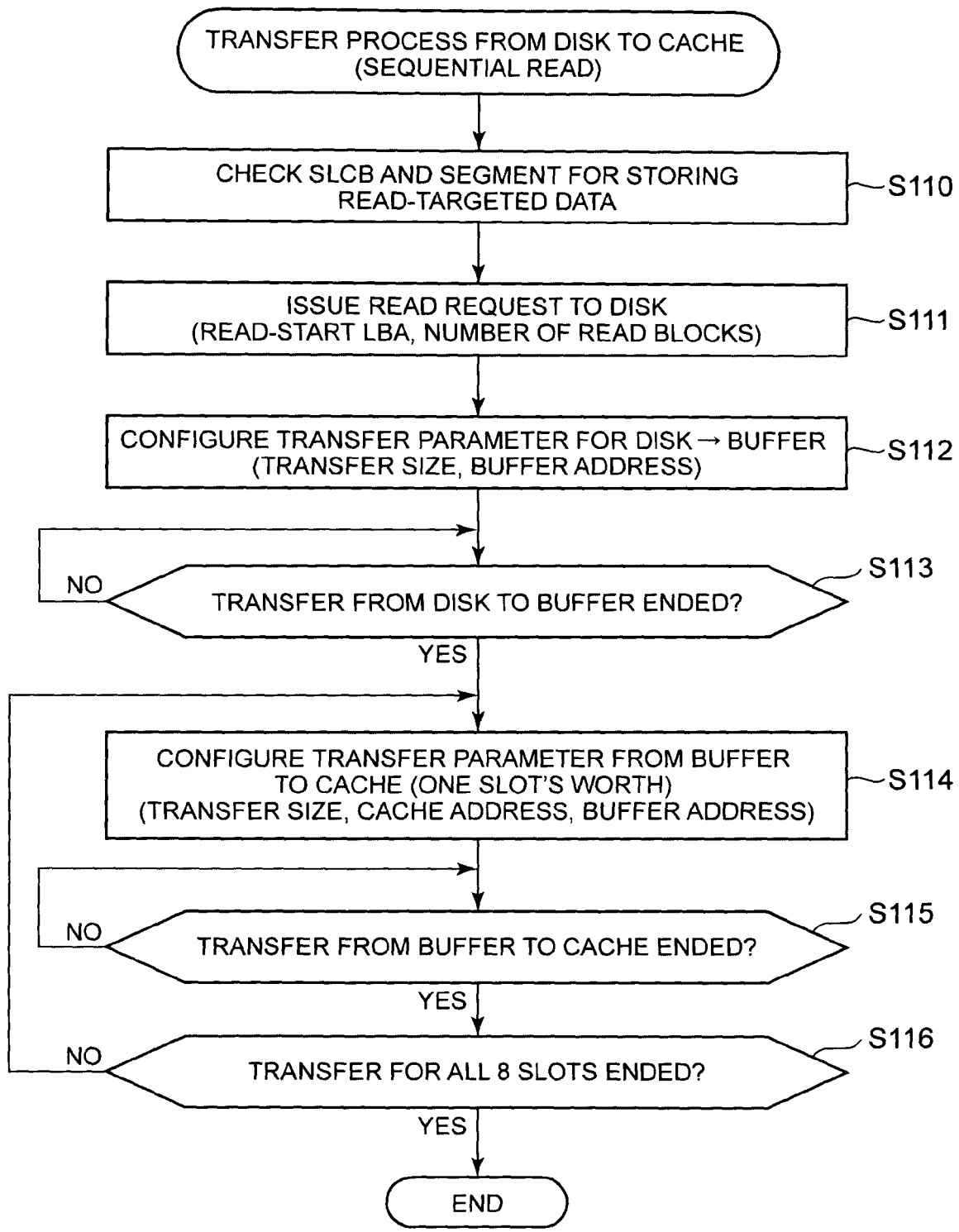
FIG. 22 is a flowchart showing the details of S106 of FIG. 21.

FIG. 22 is a flowchart showing the details of the transfer process from the disk to the cache memory presented in S106 of FIG. 21. This process is executed for both the primary storage device and the secondary storage device. That is, the prior-read process is executed simultaneously for both the primary storage device and the secondary storage device.

The DKA 120 prepares an SLCB and cache segment 131 for storing the read-targeted data (S110). The DKA 120 issues a read request to the storage device 210 (S111). This read request comprises a read-start-target LBA and the number of read-out blocks.

The DKA 120 configures a parameter in the DMA 122 for transferring data from the storage device 210 to the buffer memory 122A (S112). The DKA 120, for example, configures in the DMA 122 the number of bytes to be transferred from the storage device 210 to the buffer memory 122A, and the transfer-destination buffer address. Consequently, eight slots worth of data is transferred from the storage device 210 to the buffer memory 122A.

When there are 116 extended logical blocks per slot, the number of logical blocks corresponding to each slot is 118. Therefore, (118×8) logical blocks from the logical block specified by the read-start LBA are read out from the storage device 210, and transferred to the buffer memory 122A.

When the data transfer from the storage device 210 to the buffer memory 122A is complete (S113: YES), the DKA 120 configures in the DMA 122 a parameter, which is utilized for transferring data from the buffer memory 122A to the cache memory 130 (S114). The DKA 120, for example, configures in the DMA 122 a transfer-source buffer address, number of transfer bytes, and transfer-destination segment address. This configuration is carried out for each of eight slots. That is, the data transfer from the buffer memory 122A to the cache memory 130 is carried out for each slot.

The DKA 120 stands by until the transfer of one slot worth of data from the buffer memory 122A to the cache memory 130 has ended (S115). When the data transfer for one slot has ended (S115: YES), the DKA 120 determines whether or not the data transfer has ended for all eight slots (S116).

S114 through S115 are repeatedly executed until the data transfer from the buffer memory 122A to the cache memory 130 is complete for eight slots. When the data transfer is complete for eight slots (S116: YES), this processing ends.

Configuring this embodiment in this way also exhibits the same effect as the first embodiment. In addition, in this embodiment, it is also possible to efficiently handle data from a plurality of contiguous tracks.

Embodiment 3

Figure 23:
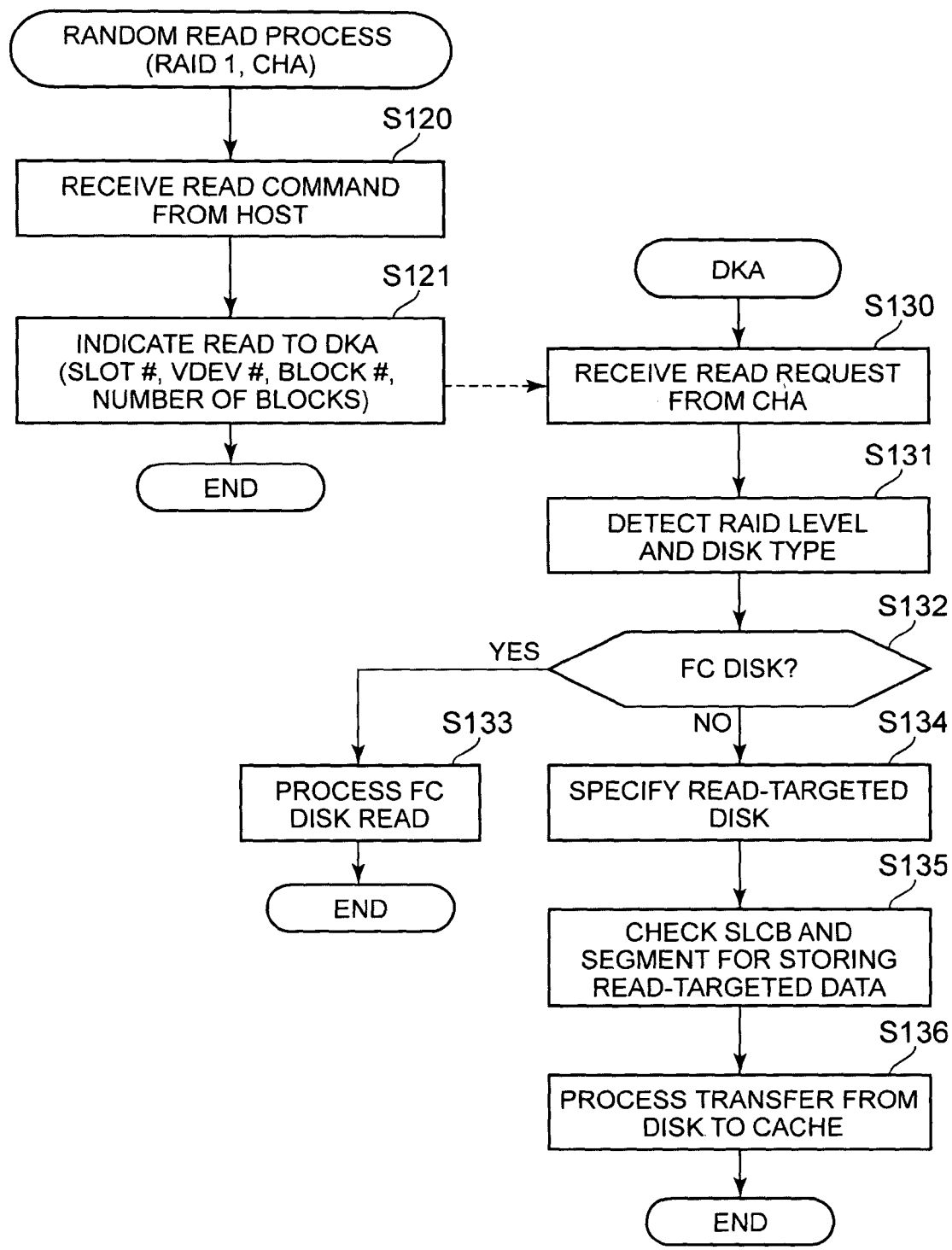
FIG. 23 is a flowchart showing a random read process, which is executed in a storage controller related to a third embodiment.

A third embodiment will be explained based on FIGS. 23 and 24. In this embodiment, the carrying out of a random read process will be explained. FIG. 23 shows a flowchart of the random read process.

The CHA 110, upon receiving a read command from the host 20 (S120), indicates a data-read to the DKA 120 (S121). This indication, for example, comprises a slot number, VDEV number, read-targeted lead block number, and number of blocks.

The DKA 120, upon receiving the indication from the CHA 110 (S130), acquires a RAID level and disk type from the VDEV management table T30 on the basis of the VDEV number (S131).

The DKA 120 determines whether or not the disk type is an FC disk (S132), and when it is determined that the disk type is an FC disk (S132: YES), executes an FC disk read process (S133).

When the read-target storage device 210 is a disk other than an FC disk (S132: NO), the DKA 120 specifies the read-target storage device 210 (S134), and prepares an SLCB and cache segment 131 for storing the read-data (S135). Then, the DKA 120 executes a data transfer from the storage device 210 to the cache memory 130 (S135).

Figure 24:
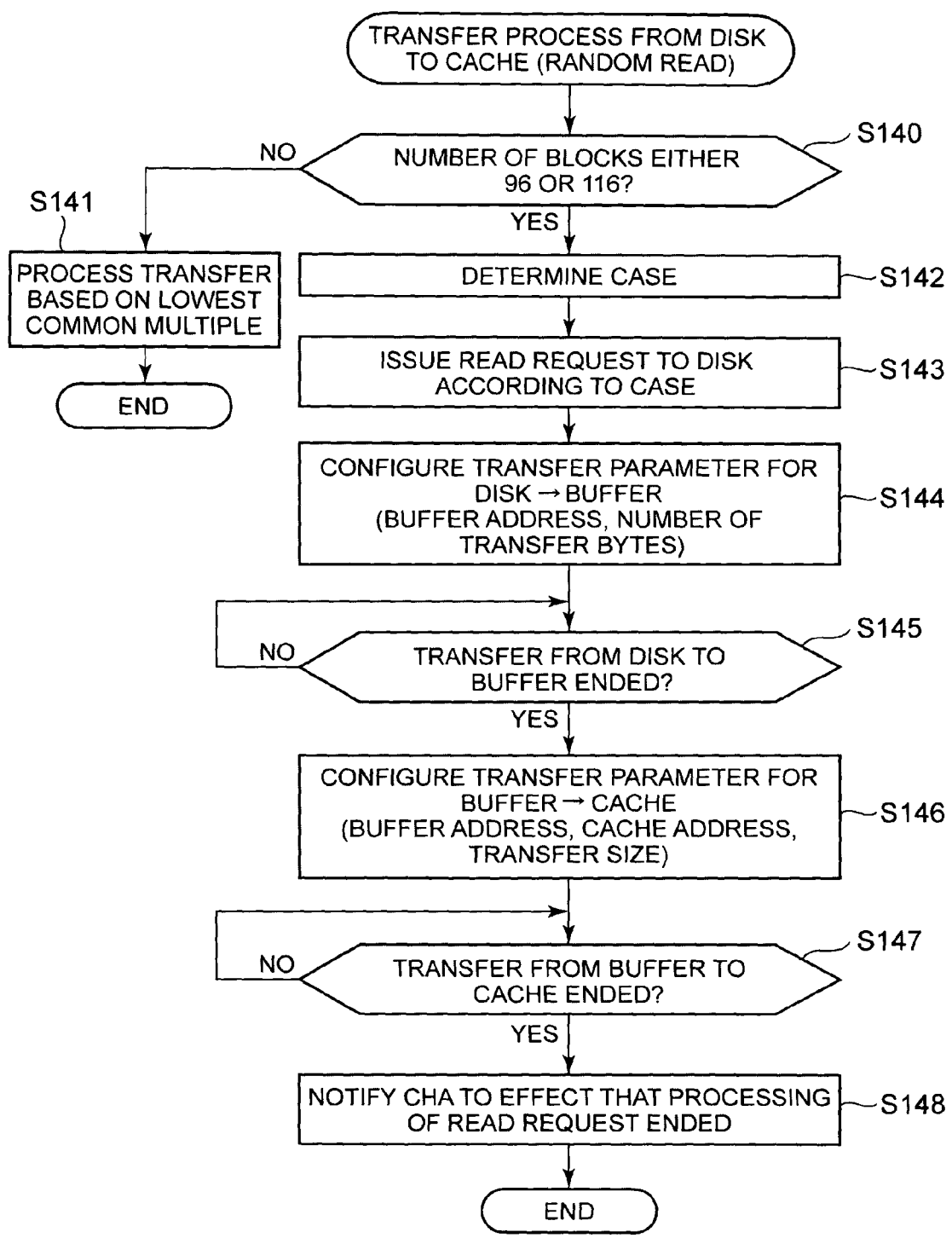
FIG. 24 is a flowchart showing the details of S136 of FIG. 23.

FIG. 24 is a flowchart of processing for carrying out the data transfer from the storage device 210 to the cache memory 130 presented as S136 in FIG. 23. The DKA 120 determines if the number of blocks per slot is either 96 blocks or 116 blocks (S140).

When the number of blocks per slot is neither 96 blocks nor 116 blocks (S140: NO), the DKA 120 transfers data from the storage device 210 to the cache memory 130 in accordance with a lowest-common-multiple-unit data access (S141).

When the number of blocks per slot is either 96 blocks or 116 blocks (S140: YES), the DKA 120 determines based on the dirty-bitmap status inside the SLCB if any of the above-described Case 1 through Case 3 pertain (S142). That is, the DKA 120 determines the case for deciding the number of transfer bytes in accordance with the track location of the read-targeted block.

The DKA 120 issues a read request to the storage device 210 in accordance with the determined case (S143). The DKA 120 configures a parameter in the DMA 122 for transferring data from the storage device 210 to the buffer memory 122A (S144). For example, the DKA 120 configures in the DMA 122 a read-target address, a transfer-destination buffer address, and number of transfer bytes. Consequently, a DMA transfer from the storage device 210 to the buffer memory 122A is started.

The DKA 120 stands by until the data transfer from the storage device 210 to the buffer memory 122A has ended (S145). When the transfer has ended (S145: YES), the DKA 120 configures a parameter in the DMA 122 for transferring the data from the buffer memory 122A to the cache memory 130 (S146). For example, the DKA 120 respectively configures in the DMA 122 a transfer-source buffer address, a transfer-destination segment address, and a number of transfer bytes. Consequently, a data transfer from the buffer memory 122A to the cache memory 130 is started. Furthermore, as was described hereinabove, the gap data 340, which was read out from the storage device 210, is not transferred to the cache memory 130.

When the data transfer from the buffer memory 122A to the cache memory 130 is complete (S147: YES), the DKA 120 notifies the CHA 110 to the effect that the processing of the read request has ended (S148). Upon receiving this notification, the CHA 110 sends the data, which has been transferred to the cache memory 130, to the host 20.

Furthermore, the guarantee code 310 is removed from the data sent to the host 20. Configuring this embodiment in this way also exhibits the same effects as the first embodiment.

Embodiment 4

A fourth embodiment will be explained based on FIG. 25. In this embodiment, the application of the present invention to RAID 5 will be explained. The respective embodiments described hereinabove were explained primarily in terms of RAID 1. However, the present invention is not limited to RAID 1, and can also be applied to other RAID levels, to include RAID 5.

Figure 25:
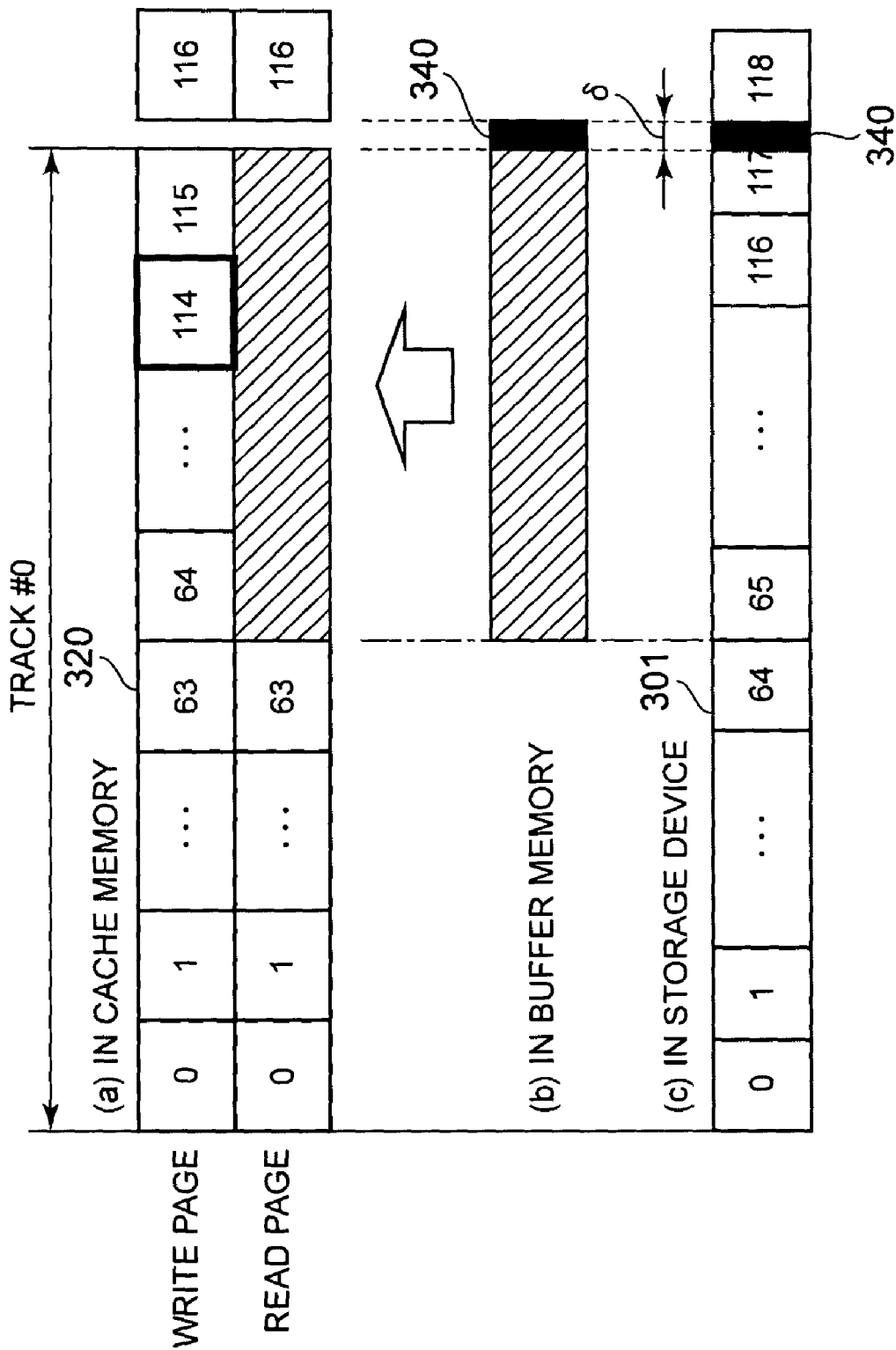
FIG. 25 is a diagram schematically showing a situation in which the present invention is applied to RAID 5 in a storage controller related to a fourth embodiment.

FIG. 25 is a schematic diagram showing how to transfer data from the buffer memory 122A to the cache memory 130 in a RAID 5. For RAID 5, a read page and a write page are prepared in the cache memory 130. The read page is a cache area for storing data read out from the storage device 210. The write page is a cache area for storing data received from the host 20.

In RAID 5, a new parity is computed on the basis of new data received from the host 20, and old data and old parity read out from the storage device 210. Therefore, unlike in a RAID 1, all the old data read out to the buffer memory 122A is transferred to the read page.

Since parity is used in RAID 5, RAID 5 differs from RAID 1 in that parity is created and transferred. However, the process for reading out old parity from the storage device 210 by way of the buffer memory 122A, and the process for writing new parity to the storage device 210 by way of the buffer memory 122A can be carried out the same as for data.

On the basis of the content disclosed in this specification and the figures, it should be possible for a so-called person having ordinary skill in the art to easily comprehend the fact that the present invention is also applicable to other RAID levels, such as RAID 6.

Embodiment 5

Figure 26:
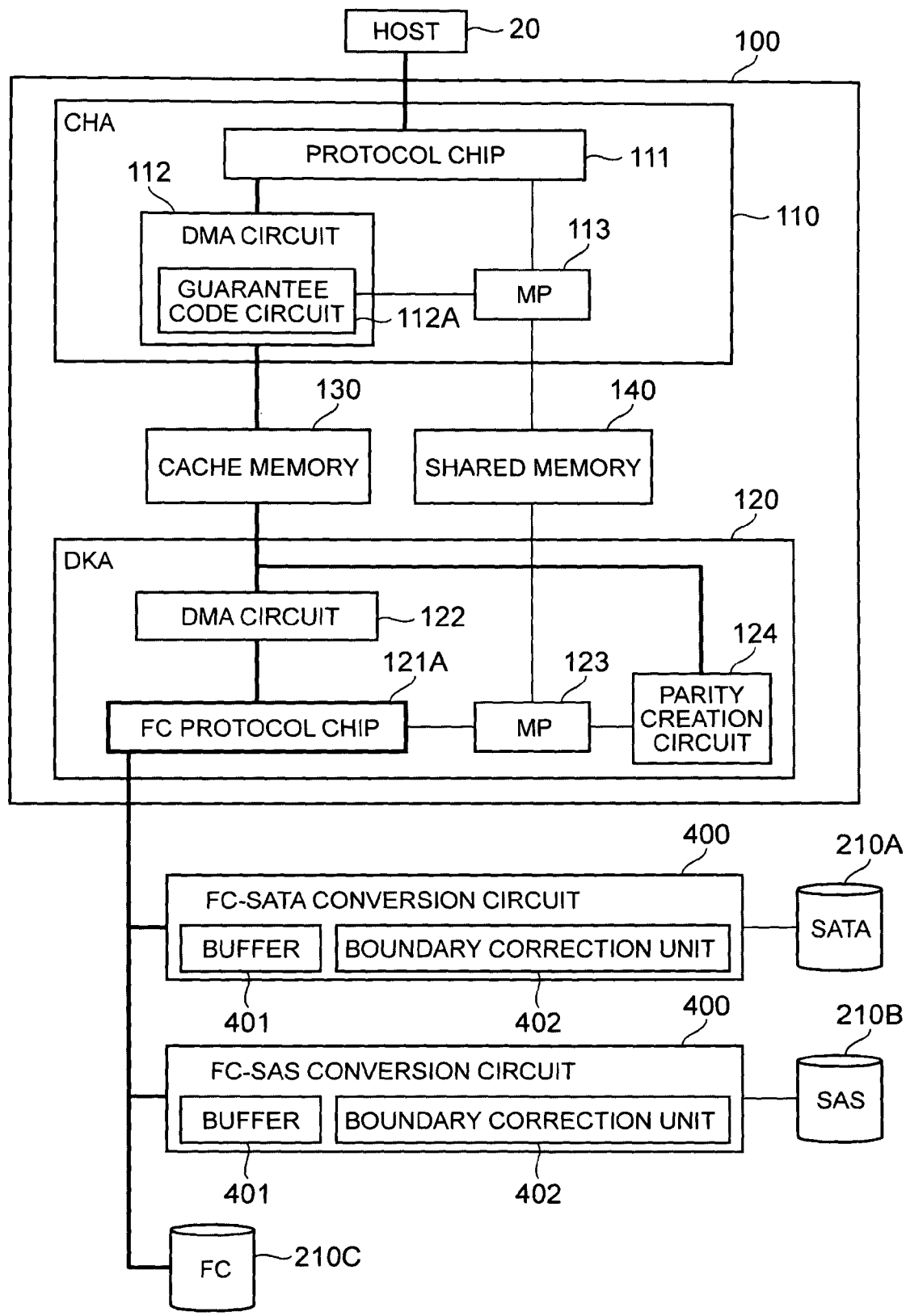
FIG. 26 is a block diagram showing the essential parts of a storage controller related to a fifth embodiment.

A fifth embodiment will be explained based on FIG. 26. In this embodiment, the boundary correction process is carried out in the storage device 210. FIG. 26 is a block diagram showing the essential parts of a storage controller according to this embodiment.

In this embodiment, the buffer memory and boundary correction program are removed from the DMA 122 of the DKA 120. Further, the protocol chip 121A is configured as a dedicated FC disk protocol chip.

A plurality of storage devices 210A through 210C of different disk types is connected to the protocol chip 121A. For example, storage device 210A is a SATA disk, storage device 210B is a SAS disk, and storage device 210C is an FC disk.

Storage device 210C, which is an FC disk, is connected as-is to the protocol chip 121A. By contrast, the storage devices 210A, 210B, which are not FC disks, are connected to the protocol chip 121A by way of respective conversion circuits 400. The respective conversion circuits 400 of storage device 210A and storage device 210B, for example, each comprise a buffer memory 401 and a boundary correction unit 402. These conversion circuits 400 are connected to control circuits inside the storage devices 210.

The buffer memory 401 temporarily stores data to be transferred to the storage device 210 from the DKA 120, and data to be transferred to the DKA 120 from the storage device 210. The boundary correction unit 402 is for carrying out a boundary correction process when transferring data from the storage device 210 to the DKA 120, and for carrying out a boundary correction process when transferring data from the DKA 120 to the storage device 210. Since the respective boundary correction processes were described in the first embodiment, explanations of these processes will be omitted here.

The DKA 120 can treat all the storage devices 210 under its control as FC disks. The DKA 120 issues a read command or a write command to the storage device 210 using a 520-byte extended logical block 320 as the unit the same as an indication to the FC disk. There is no need to carry out boundary correction inside the DKA 120. The boundary correction process is carried out by the conversion circuit 400.

Configuring this embodiment in this way also exhibits the same effects as the first embodiment. Furthermore, since boundary correction is carried out by the conversion circuit 400 disposed in the storage device 210 in this embodiment, the processing of the DKA 120 can be simplified. Further, since a SATA disk and SAS disk can be treated as FC disks, an existing storage device 210 can be utilized effectively.

Furthermore, the present invention is not limited to the above-described embodiments. A person having ordinary skill in the art will be able to make various additions and changes without departing from the scope of the present invention. A person having ordinary skill in the art will also be able to suitably combine the above-mentioned respective embodiments. For example, in the fifth embodiment, three types of storage devices are presented, but, instead of this, the present invention can also be configured using only SATA disks or only SAS disks.

What is claimed is:

1. A storage controller for controlling data input/output between a host computer and a storage device storing data, comprising:
    a first communication controller, which sends/receives data to/from said host computer, and which sends/receives the data to/from said host computer in first block units, each first block unit having a first size;
    a first data adder for creating data in second block units, each second block unit having a second size that is larger than said first size by respectively adding a prescribed first data to each of said first block units of data received from said host computer;
    a second communication controller for sending/receiving data to/from said storage device which stores the data in said first block units;
    a first memory, which is provided between said first communication controller and said second communication controller, and which manages the data in said second block units;
    a second memory, which is provided between said first memory and said storage device; and
    a boundary correction unit, which matches a boundary of a track that is a unit of data management used by said host computer, to a first block unit boundary inside said storage device, and which (1) matches said boundary of the track to said first block unit boundary inside said storage device by adding a prescribed-size second data to data to be transferred from said first memory to said second memory, and (2) matches said boundary of the track to a second block unit boundary inside said first memory by removing said second data from data to be transferred from said second memory to said first memory; wherein
    said boundary correction unit determines whether a location of a block unit on the track to be updated by said host computer corresponds to any one of:
    (C1) a first case in which said location on the track is only in a posterior area of the track, which is subsequent to an anterior area of the track from the beginning of said track to a data size determined as the lowest common multiple of said first size and said second size;

(C2) a second case in which said location on the track is in both said track anterior area and said track posterior area;

(C3) a third case in which said location on the track is only in said track anterior area, and decides a size of data transfer between said second memory and said storage device in accordance with the determined case.

2. The storage controller according to claim 1, wherein said boundary correction unit matches a start position of a lead block of data in second block units, which configures the data to be transferred from said first memory to said second memory, to the start position of said first block inside said storage device.

3. The storage controller according to claim 1, wherein said boundary correction unit, by adding said second data to the data to be transferred from said first memory to said second memory, makes this data into data that is an integral multiple of said first size.

4. The storage controller according to claim 1, wherein said second data is either padding data configured from a 0 bit, or indefinite data.

5. The storage controller according to claim 1, wherein said boundary correction unit decides a scope of data to be read out from said storage device to said second memory in accordance with a location, on said track, of said block unit to be updated by said host computer.

6. The storage controller according to claim 1, wherein said boundary correction unit and said second memory are respectively disposed in said second communication controller.

7. The storage controller according to claim 1, wherein said boundary correction unit and said second memory are respectively disposed in said storage device.

8. A method for controlling a storage controller, which controls data input/output between a host computer and a storage device, said method comprising the steps of:

receiving, from said host computer, update-targeted data in first block units having a first size;

respectively adding a prescribed first data to each of said first block units of said update-targeted data, and creating converted update-targeted data in second block units having a second size that is larger than said first size;

storing, in a first memory, said converted update-targeted data;

reading out from said storage device prescribed data of a prescribed scope comprising said update-targeted data, and storing said prescribed data in a second memory;

removing a second data from said prescribed data stored in said second memory, creating converted prescribed data of an integral multiple of said second size, and transferring this converted prescribed data to said first memory;

merging in said first memory said converted prescribed data with said converted update-targeted data stored in said first memory, and creating merged data;

transferring said merged data to said second memory;

converting in said second memory said merged data to create converted merged data of an integral multiple of said first size by adding a prescribed-size second data at the end of said merged data; and writing said converted merged data to said storage device; wherein (C1) in a first case where a location of said update-targeted data on a track is only in a track posterior area, which is subsequent to a track anterior area from the beginning of the track to a data size determined as a lowest common multiple of said first size and said second size, data of said track posterior area is read out from said storage device as said prescribed data of said prescribed scope;

(C2) in a second case where the location, on the track, of said update-targeted data is in both said track anterior area and said track posterior area, the entirety of said track is read out from said storage device as said prescribed data of said prescribed scope; and (C3) in a third case where the location, on the track, of said update-targeted data is only in said anterior area, and the data of said track anterior area is read out from said storage device as said prescribed data of said prescribed scope.

* * * * *